(12) United States Patent
Ramabadran et al.

(10) Patent No.: US 11,394,413 B2
(45) Date of Patent: Jul. 19, 2022

(54) CHARACTERISING RADIO FREQUENCY SIGNAL PROCESSING PATHS

(71) Applicant: National University of Ireland, Maynooth, Maynooth (IE)

(72) Inventors: Prasidh Ramabadran, Maynooth (IE); John Dooley, Maynooth (IE); Ronan Farrell, Kilcock (IE)

(73) Assignee: NATIONAL UNIVERSITY OF IRELAND, Maynooth (IE)

( * ) Notice: Subject to any disclaimer, the term of this patent is extended or adjusted under 35 U.S.C. 154(b) by 26 days.

(21) Appl. No.: 16/965,908

(22) PCT Filed: Jan. 29, 2019

(86) PCT No.: PCT/EP2019/052125
§ 371 (c)(1),
(2) Date: Jul. 29, 2020

(87) PCT Pub. No.: WO2019/145565
PCT Pub. Date: Aug. 1, 2019

(65) Prior Publication Data
US 2021/0044310 A1 Feb. 11, 2021

(30) Foreign Application Priority Data
Jan. 29, 2018 (GB) ...................... 1801412

(51) Int. Cl.
*H04B 1/04* (2006.01)
*H04B 17/15* (2015.01)

(52) U.S. Cl.
CPC ......... *H04B 1/0475* (2013.01); *H04B 1/0483* (2013.01); *H04B 17/15* (2015.01)

(58) Field of Classification Search
CPC ..... H04B 1/0475; H04B 17/15; H04B 1/0483
See application file for complete search history.

(56) References Cited

U.S. PATENT DOCUMENTS 5,559,517 A * 9/1996 Didomizio .......... G01S 13/9029
342/174
8,218,687 B2 * 7/2012 Sayers ................... H03D 3/009
455/313

(Continued)

*Primary Examiner* — Freshteh N Aghdam
(74) *Attorney, Agent, or Firm* — Brian J. Colandreo; Jeffrey T. Placker; Holland & Knight LLP

(57) ABSTRACT

A method for determining amplitude and phase correction coefficients for one or more signal processing paths across a frequency band of interest is provided. The method comprises transforming an input test signal from the time domain to the frequency domain to obtain an input magnitude spectrum and an input phase spectrum for the/each signal processing path. It further comprises transforming an/each respective output test signal from the time domain to the frequency domain to obtain an output magnitude spectrum and an output phase spectrum for the/each signal processing path. It also comprises comparing the/each input magnitude spectrum with its respective output magnitude spectrum to determine an amplitude correction coefficient for the/each signal processing path and/or comparing the/each input phase spectrum with its respective output phase spectrum, to determine a phase correction coefficient for the or each signal processing path.

13 Claims, 22 Drawing Sheets

(56) References Cited

U.S. PATENT DOCUMENTS

| | | | |
|---|---|---|---|
| 2009/0088120 A1* | 4/2009 | Ling | H04L 27/0014 455/314 |
| 2014/0029700 A1* | 1/2014 | Viswanathan | H03D 3/009 375/324 |
| 2014/0080437 A1* | 3/2014 | Lin | H04B 1/16 455/326 |
| 2014/0152478 A1* | 6/2014 | Lewis | H03M 1/0673 341/123 |
| 2015/0156004 A1* | 6/2015 | Khandani | H04L 1/0031 370/278 |
| 2016/0149604 A1* | 5/2016 | Khoury | H04B 1/0021 375/316 |

* cited by examiner

Frequency
(Centre frequency 2330 MHz, span 35 MHz)

Frequency
(Centre frequency 2330 MHz, span 100 MHz)

CHARACTERISING RADIO FREQUENCY SIGNAL PROCESSING PATHS

CROSS-REFERENCE TO RELATED APPLICATIONS

The subject application is a U.S. National Stage application of International Application No. PCT/EP2019/052125, filed on 29 Jan. 2019, which claims the priority of Great Britain Patent Application No. 1801412.6, filed on 29 Jan. 2018. The contents of all applications are herein incorporated by reference in their entirety.

TECHNICAL FIELD

This invention relates generally to a method of characterising radio frequency (RF) signal processing paths. Particularly, but not exclusively, the invention relates to a method of characterising the amplitude and phase variations that RF signals undergo when passing through an RF signal processing path.

BACKGROUND TO THE INVENTION

Modern wireless communications involve transmission of data through wide bandwidth modulated Radio Frequency (RF) channels. This involves generation of a high frequency RF signal known as the carrier signal whose parameters, namely amplitude, phase and frequency, are modulated according to the data intended to be transmitted by the carrier signal.

The carrier signal is processed by various stages in a transmitter and a receiver which involve amplification, filtering, mixing and radiation. The transmitted carrier signal is affected (e.g. its phase and amplitude are distorted) by the characteristics of each stage of the transmitter, whose frequency response over the intended bandwidth is critical. The bandwidth of the carrier signal is proportional to the rate at which it is modulated, i.e. the faster the data, the higher the bandwidth needed. Typically, the components needed to build each stage of the transmitter and/or the receiver are chosen in accordance with the desired bandwidth. However, no component is ideal. In particular, unavoidable imperfections in each component of the transmitter or receiver will contribute towards carrier signal degradation as it traverses each stage of the transmitter and/or receiver. Carrier signal degradation can affect the integrity of the transmitted data and the ability of the receiver to decode it.

One of the ways to mitigate this problem is to estimate the extent of degradation caused at each stage of the transmitter and attempt to pre-compensate the carrier signal to account for the degradations. This involves characterising the frequency response of the transmitter across the frequency band of interest to determine the amplitude and phase correction coefficients. This is conventionally done by means of an expensive and sophisticated instrument called a vector network analyzer. However, use of this instrument is not always practical while dealing with RF hardware of an integrated nature where it is impractical to remove each block from the transmitter system, characterize and replace it. An alternative way to accomplish this task for a single processing path is to generate sinusoidal test signals within the transmitter at single frequencies which are swept across the frequency band of interest and record the parameters of interest at each frequency, e.g. amplitude and phase corrections. However, this can be a tedious task, particularly when the bandwidth of interest is large and the number of frequencies to be characterised is high. Also, accurate time and phase synchronisation is required between the test signal generator and the detector apparatus to measure the phase variation.

RF transmitters and receivers typically comprise multiple parallel signal processing paths, such as an in-phase (I) and a quadrature (Q) path that are used to process the RF carrier signals which carry the data for transmission. The signals along the I and Q paths are ideally orthogonal to each other and it is critical to maintain the 90 degree phase difference in order to maintain the integrity of the transmitted/received data. Amplitude and phase mismatch between parallel I and Q paths caused by carrier signal degradation in each individual signal path, known as IQ imbalance, is a particular concern, and must be compensated.

Known methods of achieving amplitude and phase balances across multiple parallel signal processing paths involve applying sinusoidal test signals at single frequencies but in phase quadrature to the signal path of interest. The output of each signal processing path is subjected to single sideband (SSB) up-conversion. Up-conversion is a process of shifting the frequency of an input signal to a different value by mixing it with a sinusoidal signal generated by a local oscillator. A general up-conversion operation yields two frequency components (i.e. double-sided) at frequencies equal to sum and difference of the two input frequencies (the test signal frequency and local oscillator frequency). Single sideband up-conversion yields either the sum or the difference frequency component due to the quadrature mixing and using products where by design, either the sum or difference components could be made to appear in phase opposition so that they cancel out on combining. Conventional methods rely on the extent of cancellation of the undesired (sum or difference) frequency component in response to the test signal to indicate phase/amplitude balance. Similarly to pre-comppensating single processing paths, this process must also be repeated numerous times by sweeping the test signal in frequency across the frequency band of interest.

Aspects and embodiments of the present invention have been devised with the foregoing in mind.

SUMMARY OF THE INVENTION

According to a first aspect of the invention, there is provided a method of determining amplitude and phase correction coefficients for one or more signal processing paths across a frequency band of interest, wherein the or each signal processing path has an input and an output. The method comprises: transforming an input test signal provided to the input of the or each signal processing path from the time domain to the frequency domain to obtain an input magnitude spectrum and an input phase spectrum for the or each signal processing path; transforming an or each respective output test signal resulting from the or each input test signal being processed along its respective signal processing path from the time domain to the frequency domain to obtain an output magnitude spectrum and an output phase spectrum for the or each signal processing path; and comparing the or each input magnitude spectrum with its respective output magnitude spectrum to determine, at one or more frequencies of the frequency band of interest, an amplitude correction coefficient for the or each signal processing path. Additionally or alternatively, the method may further comprise comparing the or each input phase spectrum with its respective output phase spectrum, to determine, at the one or more frequencies of the frequency band of interest, a phase correction coefficient for the or each signal processing path.

The method advantageously provides for characterising any amplitude and phase distortions encountered by a signal as it traverses a given signal processing path across a wide range of frequencies simultaneously in a single measurement and using a single input test signal.

The output test signal may be referred to as an output response signal. The input test signal may have predetermined characteristics in the time and frequency domain. Transforming the signals from the time domain to the frequency domain may comprise performing a Fourier transform operation on the signal. Performing a Fourier transform operation may comprise a fast Fourier transform (FFT) operation.

Transforming the signals from the frequency domain to the time domain may comprise performing an inverse Fourier transform operation, e.g. an inverse FFT.

The input and output magnitude spectra may comprise a plurality of magnitude components each at a different frequency. The input and output phase spectra may comprise a plurality of phase components each at a different frequency.

The or each signal processing path may comprise various components that are configured to process the signal, e.g. amplifiers, mixers, filters, etc. By analysing and comparing the frequency components of the output test signal with the input test signal, the method provides for determining the total amplitude and phase distortions the input test signal undergoes as it traverses a signal processing path between the input and the output.

Advantageously, the method can also be applied to balancing amplitude and phase distortions between any number of parallel processing paths by comparing the output signals of the parallel paths.

Processing of the input test signal along the one more signal processing paths may comprise up-converting the input test signal to a predetermined higher frequency. For example, processing of the input test signal along the one more signal processing paths may comprise mixing the or each input test signal with a sinusoidal signal at the higher frequency. Where the or each input test signal has been up-converted, the or each respective output test signal may be or comprise a down-converted output test signal. Alternatively or additionally, the or each input test signal may be or comprise an up-converted input test signal, wherein the up-converted input test signal has been up-converted to an intermediate frequency before being provided to the input of the or each signal processing path.

In an embodiment, at least some of the one or more signal processing paths may be parallel processing paths. Where the one or more signal processing paths comprise a plurality of parallel signal processing paths, the method may further comprise comparing the output magnitude spectrum of a first of the plurality of parallel signal processing paths with the output magnitude spectrum of another of the plurality of parallel signal processing paths to determine, at the one or more frequencies of the frequency band of interest, a relative amplitude correction coefficient for the another of the plurality of parallel signal processing paths.

Additionally or alternatively, the method may further comprise, comparing the output phase spectrum and/or the numerical derivative of the output phase spectrum of the first of the plurality of parallel signal processing paths with the output phase spectrum and/or the numerical derivative of the output phase spectrum of the another of the plurality of parallel signal processing paths to determine, at the one or more frequencies of the frequency band of interest, a relative phase correction coefficient for the another of the plurality of parallel signal processing paths. The numerical derivatives are with respect to frequency.

These steps can be repeated for further parallel signal processing paths to determine the relative amplitude and phase correction coefficients for the further parallel signal processing paths relative to the first of the plurality of parallel signal processing paths.

Advantageously, the method provides for determining the relative amplitude and phase correction coefficients across a wide range of frequencies simultaneously in a single measurement and using a single input test signal.

In an embodiment, the input test signal provided to each signal processing path may be time shifted with respect to the input test signal provided to each other signal processing path.

In an embodiment, the input test signal provided to the or each signal processing path may comprise a zero amplitude portion and an oscillatory non-zero amplitude portion.

The oscillatory portion of the input test signal comprises the frequency components. The or each input test signal may comprise two zero portions, either side of the non-zero portion. The non-zero oscillatory portion may be padded by a sequence of zeros at the beginning and at the end of the non-zero portion.

Padding the beginning and the end of the non-zero portion of the or each input test signal with zeros may advantageously assist in identifying the beginning and end of the non-zero portion and temporally aligning the or each input test signal with its respective output test signal. This may be crucial where timing offsets are present between the input test signal and the out test signal. In this way, any timing offsets affect the zeros and not the non-zero portion of the output test signal.

In an embodiment, the method may further comprise the step of temporally aligning the or each input test signal with its respective output signal. Temporally aligning the or each input test signal with its respective output signal may comprise performing a cross-correlation operation between the or each input test signal and its respective output signal.

In an embodiment, the method may further comprise extracting the non-zero portion of the or each input test signal and its respective output test signal and storing the non-zero portion of the or each input test signal and its respective output test signal.

In an embodiment, the non-zero portion of each input test signal may be the same. The input magnitude spectrum and the input phase spectrum of the input test signal provided to each signal processing path may be the same. In an embodiment, the input test signal provided to one signal processing path may be orthogonal to the input test signal provided to another signal processing path, e.g. each frequency component of the input test signal provided to one signal processing path may have a phase difference of 90 degrees with respect to the corresponding frequency components of the another signal processing path.

The length of the zero portion of the input test signal provided to one signal processing path may be different to the length of the zero portion of the input test signal provided to another signal processing path. The length of the zero portion adjacent the beginning of the non-zero portion of the input test signal provided to one signal processing path may be different to the length of the zero portion adjacent the beginning of the non-zero portion of the input test signal provided to another signal processing path.

In an embodiment, the non-zero portion of the input test signal provided to each signal processing path may be time shifted with respect to the non-zero portion of the input test signal provided to each and every other signal processing path, such that the non-zero portions of each input test signal do not temporally overlap.

In an embodiment, the non-zero portion of the input test signal provided to each signal processing path may be temporally separated from the non-zero portion of the input test signal provided to each other signal processing path by a guard time interval.

In an embodiment, the input test signal may be provided simultaneously to the input of each signal processing path. The total time length (i.e. the zero portions plus the non-zero portion) of the input test signal provided to each signal processing path may be the same. Alternative, the total length of the input test signal provided to one signal processing path may be different to the total length of the input processing path provided to the input of another signal processing path.

Time delaying the non-zero portion of the input test signal provided to each signal processing path advantageously allows the respective output test signal of each signal processing path to be separated in time. This allows each output to be readily identified and/or extracted.

Comparing one spectrum (magnitude and/or phase) with another may comprise dividing one spectrum by the other to obtain ratio correction coefficients for the phase and/or amplitude, at the one or more frequencies in the frequency band in interest. Alternatively or additionally, comparing one spectrum (magnitude and/or phase) with another may comprise subtracting one spectrum from another to obtain difference correction coefficients for the phase and/or amplitude, at the one or more frequencies in the frequency band in interest.

In an embodiment, comparing the or each input magnitude spectrum with its respective output magnitude spectrum may comprise normalising the or each input magnitude spectrum and normalising its respective output magnitude spectrum to a common value. The comparing step may then further comprise dividing the or each normalised input magnitude spectrum by its respective normalised output magnitude spectrum. Alternatively, the or each normalised output magnitude spectrum may be divided by its respective normalised input magnitude spectrum. The common value may be the maximum value of the input magnitude spectrum.

Alternatively, comparing the or each input magnitude spectrum with its respective output magnitude spectrum may comprise dividing the or each input magnitude spectrum by its respective output magnitude spectrum. Alternatively, the or each output magnitude spectrum may be divided by its respective input magnitude spectrum.

Comparing the or each input magnitude spectrum with its respective output magnitude spectrum may further comprise converting the or each input magnitude spectrum and its respective output magnitude spectrum to a decibel scale or log scale. Where the scales have been converted to a decibel or log scale, comparing the or each input magnitude spectrum with its respective output magnitude spectrum may comprise subtracting the or each input magnitude spectrum from its respective output magnitude spectrum. Alternatively, the or each output magnitude spectrum may be subtracted from its respective input magnitude spectrum.

Alternatively, comparing the or each input magnitude spectrum with its respective output magnitude spectrum may comprise: subtracting the or each input magnitude spectrum by its respective output magnitude spectrum. Alternatively, the or each output magnitude spectrum may be subtracted from its respective input magnitude spectrum.

Alternatively, the comparing the or each input magnitude spectrum with its respective output magnitude spectrum may comprise: subtracting the or each normalised input magnitude spectrum from its respective normalised output magnitude spectrum. Alternatively, the or each normalised output magnitude spectrum may be subtracted from its respective normalised input magnitude spectrum.

Comparing the or each input phase spectrum with its respective output phase spectrum may further comprise differentiating the or each input phase spectrum and the or each output phase spectrum with respect to frequency and subtracting the derivative of the or each input phase spectrum from the derivative of its respective output phase spectrum. Alternatively, the derivative of the or each output phase spectrum may be subtracted from the derivative of its respective input phase spectrum.

Alternatively, comparing the or each input phase spectrum with its respective output phase spectrum may comprise subtracting the or each input phase spectrum from its respective output phase spectrum. Alternatively, the or each output phase spectrum may be subtracted from its respective input phase spectrum.

In an alternative embodiment, comparing the or each input phase spectrum with its respective output phase spectrum may comprise dividing the derivative of the or each input phase spectrum by the derivative its respective output phase spectrum. Alternatively, the derivative of the or each output phase spectrum may be divided by the derivative of its respective input phase spectrum.

In an embodiment, where there are a plurality of parallel signal processing paths, comparing the output magnitude spectrum of the first of the plurality of parallel signal processing paths with the output magnitude spectrum of the another of the plurality of parallel signal processing paths may comprise: normalising the output magnitude spectrum of the first of the plurality of parallel signal processing paths and normalising the output magnitude spectrum of the another of the plurality of parallel signal processing paths to a common value; and dividing the normalised output magnitude spectrum of the first of the plurality of parallel signal processing paths by the normalised output magnitude spectrum of the another of the plurality of parallel signal processing paths. Alternatively, the normalised output magnitude spectrum of the another of the plurality of parallel signal processing paths may be divided by the normalised output magnitude spectrum of the first of the plurality of parallel signal processing paths. The common value may be the maximum magnitude of the output response signal of the first signal processing path.

Alternatively, where there are a plurality of parallel signal processing paths, comparing the output magnitude spectrum of the first of the plurality of parallel signal processing paths with the output magnitude spectrum of the another of the plurality of parallel signal processing paths may comprise: dividing the output magnitude spectrum of the first of the plurality of parallel signal processing paths by the output magnitude spectrum of the another of the plurality of parallel signal processing paths.

Alternatively, the output magnitude spectrum of the another of the plurality of parallel signal processing paths may be divided by the output magnitude spectrum of the first of the plurality of parallel signal processing paths.

In an embodiment, where there are a plurality of parallel signal processing paths, comparing the output phase spectrum of the first of the plurality of parallel signal processing paths with the output phase spectrum of the another of the plurality of parallel signal processing paths comprises: subtracting the output phase spectrum of the first of the plurality of parallel signal processing paths from the output phase spectrum of the another of the plurality of parallel signal processing paths. Alternatively, the output phase spectrum of the another of the plurality of parallel signal processing paths may be subtracted from the output phase spectrum of the first of the plurality of parallel signal processing paths.

Alternatively, where there are a plurality of parallel signal processing paths, comparing the output phase spectrum of the first of the plurality of parallel signal processing paths with the output phase spectrum of the another of the plurality of parallel signal processing paths may comprise: differentiating the output phase spectrum of the first of the plurality of parallel signal processing paths and differentiating the output phase spectrum of the another of the plurality of parallel signal processing paths with respect to frequency; and subtracting the derivative of the output phase spectrum of the first of the plurality of parallel signal processing paths from the derivative of the output phase spectrum of the another of the plurality of parallel signal processing paths. Alternatively, the derivative of the output phase spectrum of the another of the plurality of parallel signal processing paths may be subtracted from the derivative of the output phase spectrum of the first of the plurality of parallel signal processing paths.

Alternative, the derivative of the output phase spectrum of the first of the plurality of parallel signal processing paths may be divided by the derivative of the output phase spectrum of the another of the plurality of parallel signal processing paths, or vice versa.

Advantageously, the method provides amplitude and phase correction coefficients for one or more signal processing path, and optionally, relative amplitude and phase correction coefficients, at one or more frequencies in the frequency band of interest. The amplitude and phase correction coefficients for a given signal processing path may then be applied to an input data signal intended to be provided to the given signal processing path to account for the amplitude and phase distortions that it would undergo. In this way, the input data signal may be pre-compensated to yield the desired output data signal at the output of the given signal processing path.

In an embodiment, the method may further comprise pre-compensating a data signal intended to be provided to the input of the or each signal processing path for amplitude and phase distortions encountered along the or each signal processing path. Pre-compensating the data signal may comprise: transforming the data signal from the time domain to the frequency domain to obtain a data signal magnitude spectrum and a data signal phase spectrum. Pre-compensating may further comprise: applying, at the one or more frequencies of the frequency band of interest, the amplitude correction coefficients for the or each respective signal processing path to the magnitude components of the data signal magnitude spectrum. Pre-compensating may further comprise: applying, at the one or more frequencies of the frequency band of interest, the phase correction coefficients for the or each respective signal processing path to the phase components of the data signal phase spectrum. Pre-compensating may further comprise: transforming the transformed data signal from the frequency domain to the time domain to obtain a pre-compensated data signal for the or each respective signal processing path.

Where the amplitude correction coefficients are obtained by dividing one spectra by another, the magnitude components of the data signal magnitude spectrum should be multiplied by the amplitude correction coefficients. Alternatively, where the amplitude correction coefficients are obtained by subtracting one spectra from another, the amplitude correction coefficients should be added to the magnitude components of the data signal magnitude spectrum.

In an embodiment, applying the amplitude correction coefficients may comprise multiplying the one or more magnitude components of the data signal magnitude spectrum at the one or more frequencies of the frequency band of interest by the amplitude correction coefficients. Applying the phase correction coefficients may comprise adding the phase correction coefficients to the one or more phase components of the data signal phase spectrum at the one or more frequencies of the frequency band of interest.

In an embodiment, where the one or more signal processing paths comprise a plurality of parallel signal processing paths, the method may further comprise: applying, at the one or more frequencies of the frequency band of interest, the relative amplitude correction coefficients for the another of the plurality of parallel signal processing paths to the magnitude components of the data signal magnitude spectrum of the data signal intended to be provided to the input of the another of the plurality of parallel signal processing paths. The method may further comprise: applying, at the one or more frequencies of the frequency band of interest, the relative phase correction coefficients for the another of the plurality of parallel signal processing paths to the phase components of the data signal phase spectrum of the data signal intended to be provided to the input of the another of the plurality of parallel signal processing paths.

Applying the relative amplitude correction coefficients may comprise multiplying the one or more magnitude components of the data signal magnitude spectrum at the one or more frequencies of the frequency band of interest by the relative amplitude correction coefficients. Applying the relative phase correction coefficients may comprise adding the relative phase correction coefficients to the one or more phase components of the data signal phase spectrum at the one or more frequencies of the frequency band of interest.

The input test signal may be characterised by comprising multiple frequency components, each with their own amplitude and phase. The or each input test signal may be or comprise one or more RF signals. The input test signal provided to the input of the or each signal processing path may comprise a predetermined frequency bandwidth. The input test signal provided to the input of the or each signal processing path may have a frequency bandwidth substantially equal to the frequency band of interest.

The predetermined frequency bandwidth may depend on the application, and/or the relevant wireless standard, and/or the speed of one or more components in the or each signal processing path. As such, the bandwidth is not limited to a specific range. In an embodiment, the predetermined frequency bandwidth of the input test signal may be up to 20 MHz, 60 MHz, 100 MHz or 200 MHz.

The input test signal provided to the input of the or each signal processing path may be or comprise a signal whose frequency spectra exhibit a substantially uniform amplitude profile and a substantially linear phase profile in the frequency band of interest.

In an embodiment, the input test signal provided to the input of the or each signal processing path may be or comprise a sinc function. The input test signal may be or comprise a truncated sinc function. The truncated sinc function may be or comprise a sinc function multiplied by a window function. The window function may comprise smoothly tapered sides in the time domain. The window function may further comprise a substantially uniform magnitude spectrum in the frequency band of interest. In an embodiment, the window function may be or comprise any of: a Hamming window, a Blackman window, a Hanning window, a Hann window, or a Nuttall window. The sinc function may be or comprise a truncated sinc function.

Alternatively, the input test signal provided to the or each signal processing path may be or comprise a chirp signal.

The method may further comprise defining the bandwidth of the input test signal, and optionally, a sampling frequency. The method may further comprise generating the input test signal having the predetermined characteristics in the time and frequency domain.

The method may further comprise: providing the input test signal to the input of the or each signal processing path; and detecting the or each respective output test signal at the respective output of the or each signal processing path.

Where there is more than one signal processing path, at least some of the signal processing paths may share a common output.

In an embodiment, the method may further comprise storing the amplitude and phase correction coefficients, and optionally the relative amplitude and phase correction coefficients.

According to a second aspect of the invention, there is provided a method of pre-compensating a data signal intended to be providing to an input of a signal processing path for amplitude and phase distortions encountered along the signal processing path at one or more frequencies of a frequency band of interest. The method comprises: transforming the data signal from the time domain to the frequency domain to obtain a data signal magnitude spectrum and a data signal phase spectrum. The method may further comprise applying, at the one or more frequencies of the frequency band of interest, predetermined amplitude correction coefficients for the signal processing path to the magnitude components of the data signal magnitude spectrum. The method may further comprise applying, at the one or more frequencies of the frequency band of interest, predetermined phase correction coefficients for the signal processing path to the phase components of the data signal phase spectrum. The method may further comprise transforming the transformed data signal from the frequency domain to the time domain to obtain a pre-compensated data signal for the signal processing path.

The magnitude and phase correction coefficients may be determined using the method of the first aspect.

According to a third aspect of the invention, there is provided a method of determining relative amplitude and phase correction coefficients for a plurality of parallel signal processing paths across a frequency band of interest, each of the plurality of parallel signal processing paths having an input and an output. The method comprises: transforming an output test signal, resulting from an input test signal provided to the respective input of the each of the plurality of parallel signal processing paths being processed along the respective signal processing path, from the time domain to the frequency domain to obtain an output magnitude spectrum and an output phase spectrum for the each of the plurality of parallel signal processing paths. The method may further comprise: comparing the output magnitude spectrum of a first of the plurality of parallel signal processing paths with the output magnitude spectrum of another of the plurality of parallel signal processing paths to determine, at one or more frequencies of the frequency band of interest, a relative amplitude correction coefficient for the another of the plurality of parallel signal processing paths. Additionally or alternatively, the method may further comprise: comparing the output phase spectrum of the first of the plurality of parallel signal processing paths with the output phase spectrum of the another of the plurality of parallel signal processing paths to determine, at one or more frequencies of the frequency band of interest, a relative phase correction coefficient for the another of the plurality of parallel signal processing paths.

In an embodiment, comparing the output magnitude spectrum of the first of the plurality of parallel signal processing paths with the output magnitude spectrum of the another of the plurality of parallel signal processing paths comprises: normalising the output magnitude spectrum of the first of the plurality of parallel signal processing paths and normalising the output magnitude spectrum of the another of the plurality of parallel signal processing paths to a common value; and dividing the normalised output magnitude spectrum of the first of the plurality of parallel signal processing paths by the normalised output magnitude spectrum of the another of the plurality of parallel signal processing paths. Alternatively the normalised output magnitude spectrum of the another of the plurality of parallel signal processing paths may be divided by the normalised output magnitude spectrum of the first of the plurality of parallel signal processing paths.

Alternatively, the method may comprise dividing the output magnitude spectrum of the first of the plurality of parallel signal processing paths by the output magnitude spectrum of the another of the plurality of parallel signal processing paths. Alternatively, the output magnitude spectrum of the another of the plurality of parallel signal processing paths may be divided by the output magnitude spectrum of the first of the plurality of parallel signal processing paths.

In an embodiment, comparing the output phase spectrum of the first of the plurality of parallel signal processing paths with the output phase spectrum of the another of the plurality of parallel signal processing paths may comprise: subtracting the output phase spectrum of the first of the plurality of parallel signal processing paths from the output phase spectrum of the another of the plurality of parallel signal processing paths. Alternatively, the output phase spectrum of the another of the plurality of parallel signal processing paths may be subtracted from the output phase spectrum of the first of the plurality of parallel signal processing paths.

According to a fourth aspect of the invention, there is provided an apparatus for carrying out the method of any of the first to third aspects. The apparatus may comprise a digital signal processor (DSP) configured to provide a wide bandwidth input test signal to an input of one or more signal processing paths. The apparatus may further comprise a signal detector configured to detect an output test signal at an output of the one or more signal processing paths resulting from the or each input test signal being processed along the respective one or more signal processing paths.

The signal detector may be configured to detect a plurality of output test signals each from a difference signal processing path. The signal detector may be in data communication with the DSP. The signal detector may be configured to feed the received output test signal back to the DSP for processing.

The DSP may be configured to transform the or each input test signal and each respective output test signal from the time domain to the frequency domain. The DSP may further be configured to compare the or each input magnitude spectrum with its respective output magnitude spectrum to determine an amplitude correction coefficient at one or more frequencies in the frequency band of interest, and to compare the or each input phase spectrum with its respective output phase spectrum to determine a phase correction coefficient at the one or more frequencies in the frequency band of interest. The DSP may further be configured to generate the or each input test signal.

The signal detector may be a calibrated reference receiver. The reference receiver may be any calibrated RF receiver capable of operating over the frequency band interest, and optionally or preferably capable of performing vector down conversion. The reference receiver may be a vector signal analyser or a high speed analogue to digital converter with a calibrated RF front end for vector down-conversion.

The reference receiver may comprise a vector down-converting RF front end followed by one or more analogue to digital converters (ADCs). The reference receiver may comprise a pair of ADCs, one each to digitize the outputs of the in-phase and quadrature paths of the vector down-converter, respectively. Alternatively, the reference receiver may comprise a scalar RF down-converter followed by a high speed ADC.

The apparatus may further comprise a combiner to combine the output test signals of each signal processing path before being detected at the detector.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and these embodiments are specifically envisaged.

BRIEF DESCRIPTION OF DRAWINGS

In order that the invention can be well understood, embodiments will now be discussed by way of example only with reference to the accompanying drawings, in which:

FIG. 14a shows the normalised magnitude spectrum of the first and second input test signals shown in FIGS. 10a and 10b;

FIG. 14b shows the normalised magnitude spectra of the first and second output responses shown in FIGS. 13a and 13b;

FIG. 14c shows the first derivative of the phase spectra of the first and second output responses shown in FIGS. 13a and 13b compared to that of the first input test signal of FIG. 10a;

DETAILED DESCRIPTION

Figure 1:
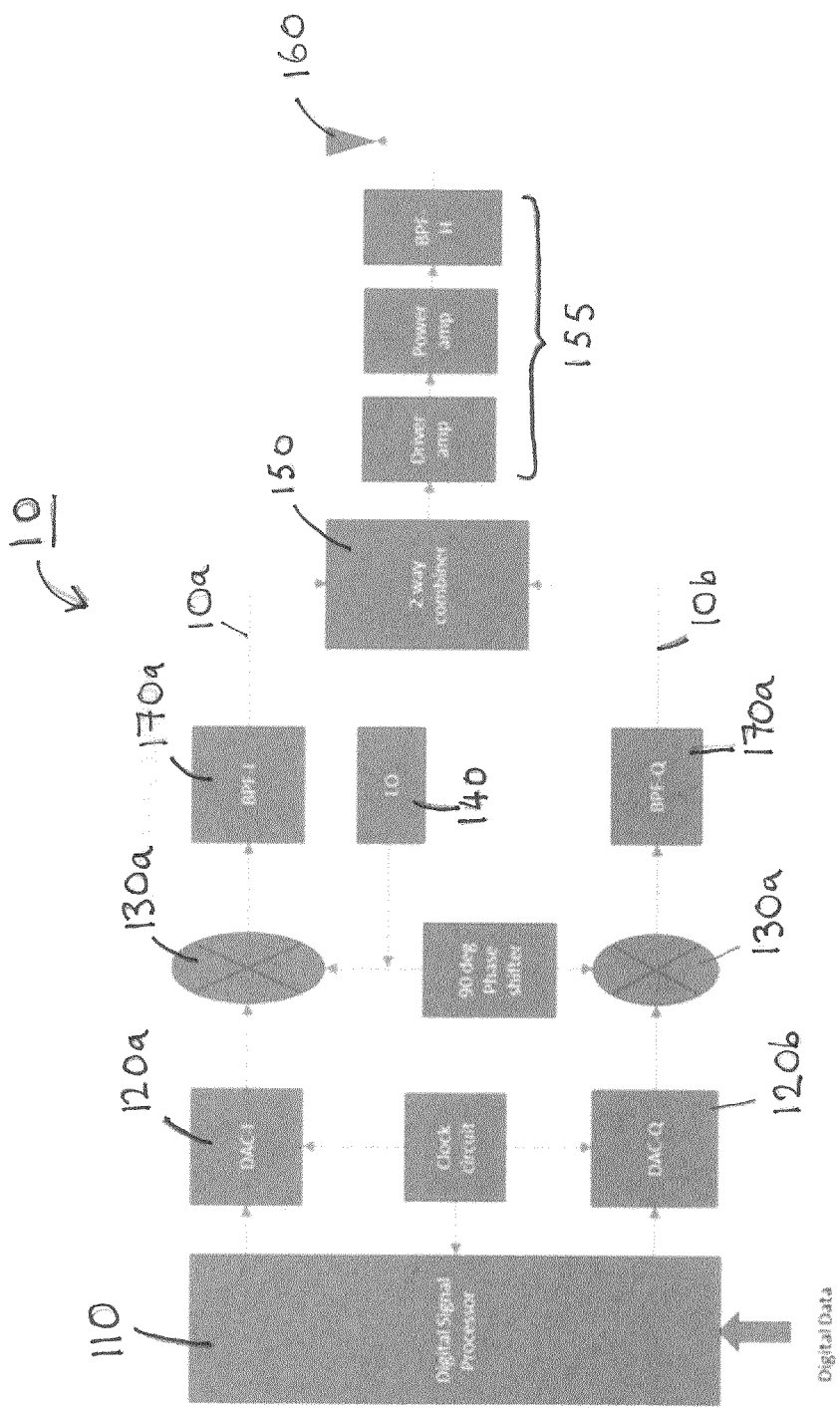
FIG. 1 shows a generalised block diagram of a wireless transmitter.

FIG. 1 shows a generalised block diagram of a typical wireless transmitter 10 with two parallel signal processing paths 10a, 10b. The transmitter 10 comprises a digital signal processor (DSP) 110 configured to generate a digital baseband signal in response to input digital data intended to be transmitted. The digital baseband signal comprises a series of modulation symbols that represent a specific state of a wave (i.e. its phase, amplitude and frequency). Each modulation symbol can represent a bit of digital information or a number/group of bits. The digital baseband signal is provided to a pair of digital to analogue converters (DACs) 120a, 120b to generate equivalent analogue baseband signals at frequency $f_b$. The analogue baseband signals are up-converted to a higher (RF) carrier frequency ($f_c$) by means of mixers 130a, 130b and a local oscillator (LO) 140. The mixer 130a, 130b acts as a signal multiplier which multiplies the analogue baseband signal with a sinusoidal signal generated by the LO at a LO frequency ($f_{LO}$). This operation performs a frequency translation of the baseband signal to the carrier frequency $f_c$. Each signal path 10a, 10b may further comprise a band pass filter 170a, 170b. The up-converted signals are then combined at a combiner 150 to form the modulated carrier signal with the encoded digital data. The modulated carrier signal changes its state according to each successive modulation symbol. The carrier signal may be further amplified and filtered through components 155, and transmitted through an antenna 160. The transmitted carrier signal may then be received by a receiver (not shown) where it is down-converted to extract the baseband signal and its data.

The digitally generated vector modulation symbols may also be represented in the form of complex numbers. The real part of the complex number is designated as the in-phase (I) component of the waveform and the imaginary part of the complex number is designated the quadrature (Q) component (i.e. out of phase). The I and Q components of the modulation symbols are orthogonal to each other, i.e. they exhibit a 90 degree phase difference. Separation of the modulation symbols into I and Q components is known as IQ modulation, and is an effective and widely used way to transfer digital information.

Referring to FIG. 1, the two signal paths correspond to an I baseband channel and a Q baseband channel. In one example, the DSP 110 sends the I component of the digital baseband signal to DAC 130a and the Q component of the digital baseband signal to DAC 130b. The I and Q components of the digital baseband signal are then converted to equivalent analogue I and Q baseband signals at the DACs 130a, 130b. The respective phases of the sinusoidal signals generated by the LO that up-convert the I and Q baseband signals are also in quadrature i.e. phase shifted by 90 degrees.

It is critical to maintain the phase difference (90 degrees) between the I and Q components throughout the transmit chain in order to maintain the integrity of the encoded data. In addition to maintaining the phase relationship between the I and Q paths, there is also a need to maintain a balance in the amplitude responses between I and Q paths. It is therefore necessary to characterise the frequency response of each stage of the transmitter over the frequency range of interest to compensate for any amplitude and/or phase variations that the signals undergo along each signal path.

The range of frequencies occupied by the baseband signal (i.e. the bandwidth) is proportional to the rate of change of the modulation symbols per second, which is in turn proportional to the rate of change of bits per second, which can be large. For example, an ideal wireless transmission system where the input bits change at a rate of 200 megabits per second (Mbps) and employing a quadrature phase shift keying modulation scheme (where each modulation symbol represents two bits) requires a bandwidth of 100 MHz.

In an embodiment of the invention, there is provided a method of characterising the phase and amplitude shifts that a wide bandwidth RF signal experiences along a chosen RF signal processing path using a single measurement in a fast and efficient manner. The method comprises applying a wide bandwidth test signal to an input of an RF signal processing path, measuring the output signal at an output of the signal processing path, and determining amplitude and phase correction coefficients which could be applied to the input test signal such that the desired output signal is obtained. The method relies on performing time and frequency domain analysis of the test signal at the input and the output to extract the relative changes in phase and amplitude across the whole test signal bandwidth simultaneously.

The test signal may have a bandwidth wide enough to cover the bandwidth of operation of the RF hardware. A desirable test signal would be one which excites the whole band of the desired frequencies with the same amplitude, has no frequency component outside the frequency band of interest and maintains a pre-determined phase across the frequency band of interest. Such a signal would have a rectangular profile in the frequency domain. However, a rectangular profile in the frequency domain transforms to a sinc function in the time domain. The sinc function is obtained by dividing a sinusoidal function with its parametric variable, e.g. sin(x)/x. However, the sinc function is an infinitely long non-zero signal in the time domain (it does not drop to zero amplitude) and is therefore not a practical test signal for use in characterising signal processing paths.

In an embodiment, the wide bandwidth test signal is a sinc-like pulse of finite temporal length, i.e. a truncated sinc pulse. The truncated sinc-like pulse has a near trapezoidal profile in the frequency domain instead of being rectangular. An example truncated variant of the sinc function is obtained by multiplying the sinc function by a window function. An example sinc-like test pulse is obtained using the Hamming window, and is given by the following equation:

$$h(n) = \sin\frac{\left(2\pi f_{cut}\left(n - \frac{M}{2}\right)\right)}{\left(n - \frac{M}{2}\right)} * \left(0.54 - 0.46 * \left(\cos\left(2\pi \frac{n}{M}\right)\right)\right) \quad (1)$$

where, M is the length (in time) of the sinc pulse, n is the sample number ranging from '0' to 'M', and $f_{cut}$ is the cut-off frequency. The bandwidth of the sinc-pulse is $2f_{cut}$. In equation 1, the first term on the right hand side is the sinc function and the second term is the Hamming window.

Figure 2:
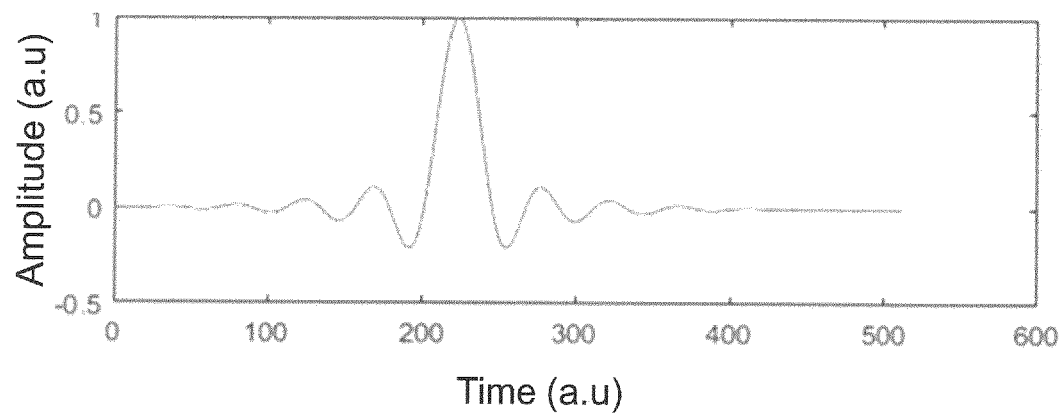
FIG. 2 shows an example wide bandwidth input test signal.
Figure 3:
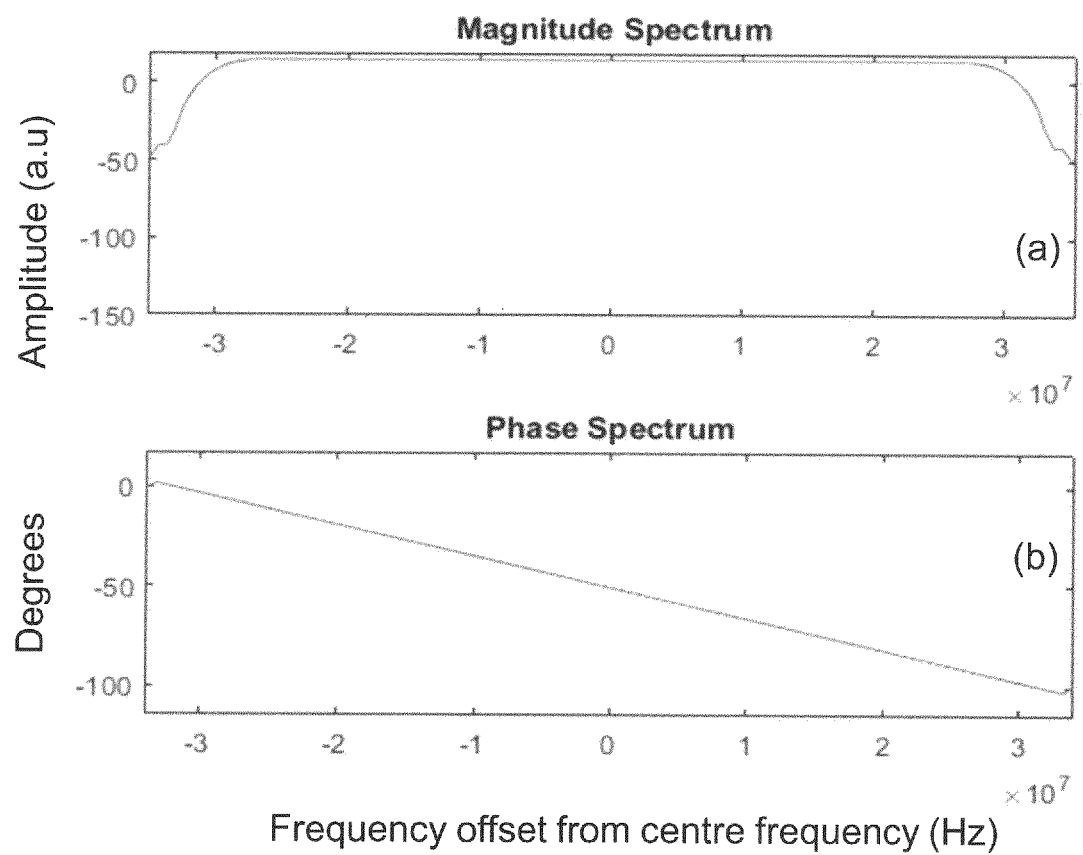
FIGS. 3a and 3b show the magnitude and phase spectra of the input test signal of FIG. 2, respectively.

FIG. 2 shows an example sinc-like test signal in the time domain generated using equation 1. FIGS. 3a and 3b show the corresponding magnitude and phase response in the frequency domain obtained from the fast Fourier transform (FFT) of the test signal shown in FIG. 2 (offset with respect to the centre frequency). The bandwidth of the test signal shown in FIGS. 2 and 3 is approximately 60 MHz. A characteristic of the sinc-like test signal is a substantially linear phase response in the frequency domain (see FIG. 3b). This may be advantageous to characterise frequency dependent phase distortion of an RF hardware module, as will be discussed further below.

The length of the input test signal depends on the transition bandwidth of the truncation window function from the pass band to stop band, i.e. it depends on the slope of the tapers in the frequency domain. Longer input test signals are required for window functions with sharper profiles, i.e. smaller tapers. This also affects the Peak to Average Power Ratio of the input test signal.

Figure 4:
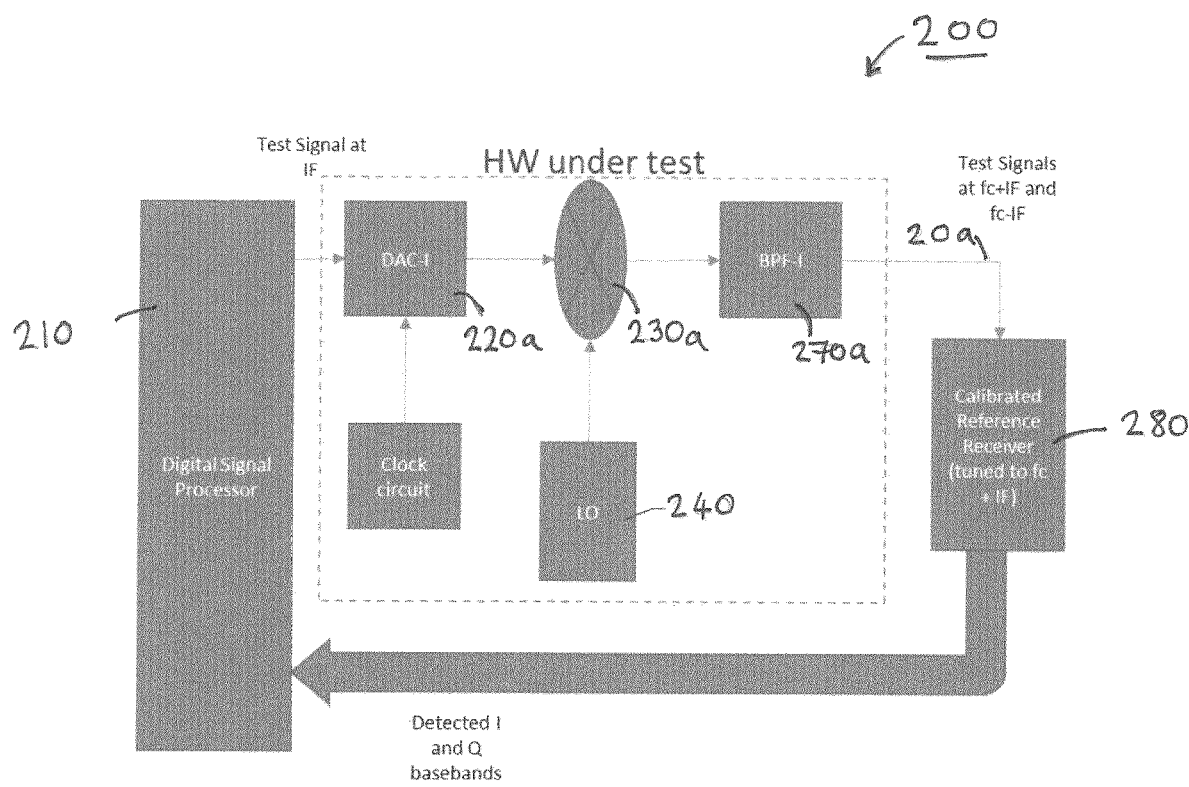
FIG. 4 shows a generalised block diagram of an example test apparatus for determining amplitude and phase correction coefficients for a signal processing path.

FIG. 4 shows a generalised block diagram of a test apparatus 20 for characterising the wide bandwidth characteristics of a single RF signal processing path. The single processing path 20a shown in FIG. 4 essentially comprises one half of the transmitter 10 shown in FIG. 1. In this case, the apparatus 20 comprises a DSP 210, a DAC 220a, a mixer 230a, a LO 240 and a reference receiver 280. A band pass filter 270a is optional, but in this example is considered part of the transmit chain which requires characterising. The signal path 20a may comprise additional components that require characterising.

The DSP 210 is configured to digitally generate the input wide bandwidth test signal at the baseband frequency J with the intended bandwidth (the input test baseband signal). The input test signal is provided to the DAC 220 to generate an equivalent analogue input test signal which is then mixed with the sinusoidal signal generated by the LO 240 at $f_{LO}$ to produce an up-converted test carrier signal centred at the carrier frequency $f_c$.

The output of the signal path 20a is detected by the reference receiver 280 and fed back to the DSP 210 for amplitude and phase analysis. The reference receiver 280 may be a calibrated reference receiver used to down-convert the received output test carrier signal back to the baseband frequency to obtain the in phase (I) and out of phase (Q) components of the test signal which has traversed the signal path 20a, referred to here as the output response. The response contains the phase and amplitude distortion information for the signal processing path under test. The reference receiver 280 may be a vector network analyser or a high speed analogue to digital converter (ADC) with a calibrated RF front end capable of vector down-conversion and logging the samples of the I and Q components of the output response. The down-converted I and Q components of the output response streamed back to the DSP 210 form the basis for the amplitude and phase calibration across the signal path 20a. Alternatively, the reference receiver 280 may comprise a scalar RF down-converter followed by a high speed ADC, and down-conversion may be performed digitally at the DSP 210.

Figure 5:
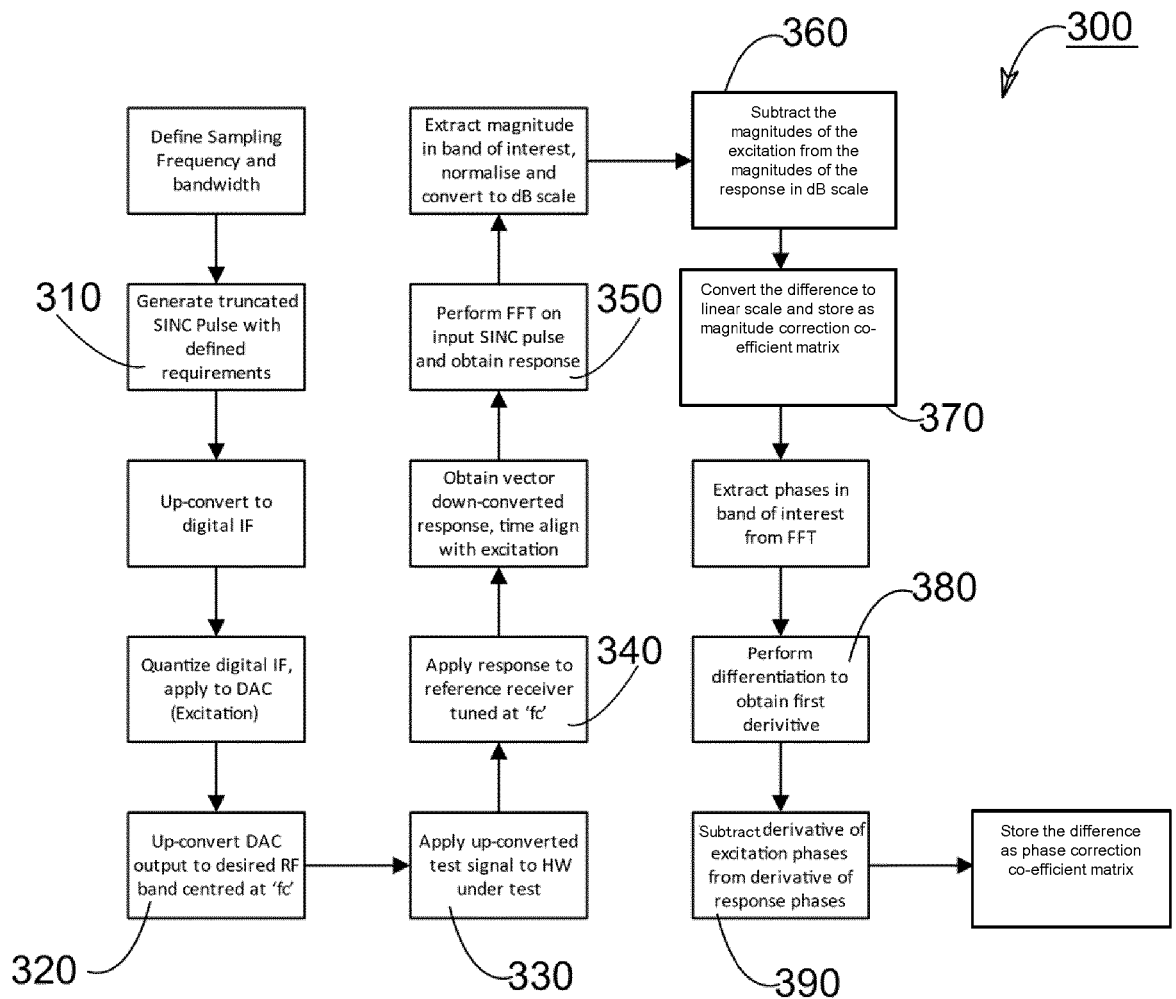
FIG. 5 shows a method of determining amplitude and phase correction coefficients for a signal processing path.

FIG. 5 illustrates a method 300 of characterising phase and amplitude correction coefficients for a single signal path 20a according to an embodiment of the invention.

In step 310, the wide bandwidth input test signal is generated with the predetermined characteristics, e.g. bandwidth. The wide bandwidth test signal may be a sinc-like test signal such as that shown in FIG. 2. The generating step 310 may comprise digitally generating the input test signal with the DSP 210 and subsequently generating an equivalent analogue input test signal via the DAC 220. Additionally or alternatively, generating the input test signal may further comprise digitally up-converting the generated input test signal with the DSP 210 to an intermediate frequency f, and then applying it to the DAC 220.

In step 320, the input test signal is up-converted to the desired RF band centred on the carrier frequency $f_c$. In step 330, the up-converted test signal is provided to the input of the signal path under test 20a, where it may undergo amplitude and phase distortions.

In step 340, the output of the signal path under test 20a is detected by the reference receiver 280 and vector down-converted to obtain the I and Q components of the output response. The output response may then be fed back to the DSP 210.

As the timing circuits in the reference receiver 280 are different from the timing circuits in the apparatus 20, timing offsets may occur between the input test signal and the output response fed back to the DSP 210. To identify any timing offsets and/or propagation delays, the beginning and the end of the input test signal may be marked by padding it with zeros (before it is provided to the DAC 220). This in turn marks the beginning and the end of the output response signal received by the reference receiver 280. In this way, any timing offsets in the reference receiver 280 affect the zeros and not the up-converted non-zero portion of the test signal. Any timing offsets can then be eliminated by temporally aligning the output response and the input test signal. In an embodiment, this is achieved by performing a cross-correlation operation between the magnitude of the output response (typically including zero padding) and the magnitude of the input test signal (typically without zero padding).

In step 350, an FFT operation is performed on the input test signal and the detected output response. In this step, the magnitude and phase spectra of the input test signal and the output response are obtained. Step 350 may further comprise normalising the magnitude spectra of the input test signal and the output response to their respective maximum valves (or any common value) and extracting the normalised magnitude values in the frequency band of interest (in any order), or vice versa. The extracted normalised magnitude values may optionally be converted to decibel (dB) scale. Step 350 may further comprise extracting the phase values in the frequency band of interest.

In step 360, the magnitude spectrum of the output response is divided by the magnitude spectra of the input test signal to obtain a magnitude ratio spectrum (or vice versa). Ideally, if no amplitude distortion has occurred along the signal path 20a, the magnitude ratio spectrum yields a flat curve (i.e. a constant value). Any amplitude distortion in the output response manifests as variations about a mean value in the magnitude difference spectrum. Where the magnitude spectra are converted to dB scale, step 360 comprises subtracting the magnitude spectrum of the output response from the magnitude spectra of the input test signal.

In step 370, the magnitude difference components obtained in step 360 are stored as the amplitude correction coefficients in the band of interest. The amplitude correction coefficients may be stored in an amplitude correction coefficient matrix. Step 370 may yield amplitude correction coefficients for any or each frequency sampled within the frequency band of interest.

The frequency resolution depends on the number of FFT points which in turn depends on the application. If the RF signal processing path under test needs to transmit a signal whose modulation has occurred in the frequency domain such as 'Orthogonal frequency division Multiplexing' (OFDM), the FFT resolution must be equal to or smaller than the sub-carrier spacing in the applicable modulation scheme. The maximum sample rate depends on the DAC chosen in the RF signal processing paths. In the proposed method, the frequency resolution is at maximum by default for a given sample rate since the input test signal, e.g. a sinc pulse, excites every frequency component that falls within its bandwidth. The resolution of the DSP is usually fixed in a wireless hardware and is application dependent.

In step 380, the phase spectra of the input test signal and the output response are differentiated with respect to frequency to obtain the first derivative. In step 390, the first derivative of the input test signal phase spectrum is subtracted from the first derivative of the output response phase spectrum to yield the phase correction coefficients in the frequency band of interest. The phase correction coefficients may be stored, and optionally stored in a phase correction coefficient matrix. Step 390 may yield phase correction coefficients for any or each frequency sampled within the frequency band of interest.

The absolute phase of each frequency component of the output response is of little interest, but the relative variations of phase across the bandwidth of interest is of primary consideration. As the sinc-like input test signal obtained using the Hamming window exhibits a linear phase profile, the first derivative of the phase spectrum would be a constant. Any non-linearity in the phase spectrum of the output response would be apparent while its first derivative is plotted against that of the input test signal across the frequency band of interest.

Figure 6:
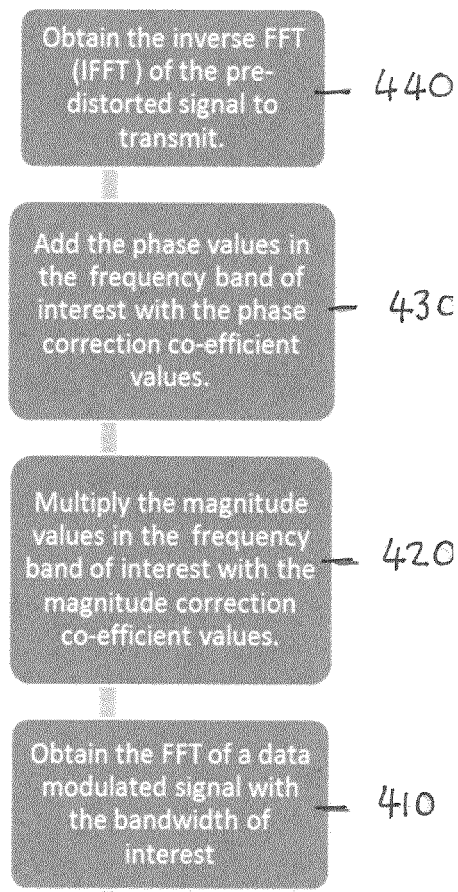
FIG. 6 shows a method of pre-compensating a signal for amplitude and phase distortions.

FIG. 6 illustrates a method 400 of pre-compensating a data modulated baseband signal having the bandwidth of interest to account for any frequency dependent amplitude and phase distortion that it would undergo as it traverses the signal path 20a. Method 400 may be carried out after the steps of method 300. In step 410, an FFT operation is performed on the data modulated baseband signal to obtain the magnitude and phase spectra. In step 420, the amplitude correction coefficients for the frequency band of interest, e.g. obtained at step 370, are multiplied with the magnitude components of the data modulated baseband signal. In step 430, the phase correction coefficients for the frequency band of interest, e.g. obtained at step 390, are added to the phase components of the data modulated baseband signal. In step 440, an inverse FFT operation is performed on the modified amplitude and phase spectra of the data modulated baseband signal to obtain a pre-compensated data modulated baseband signal for transmission.

Figure 7:
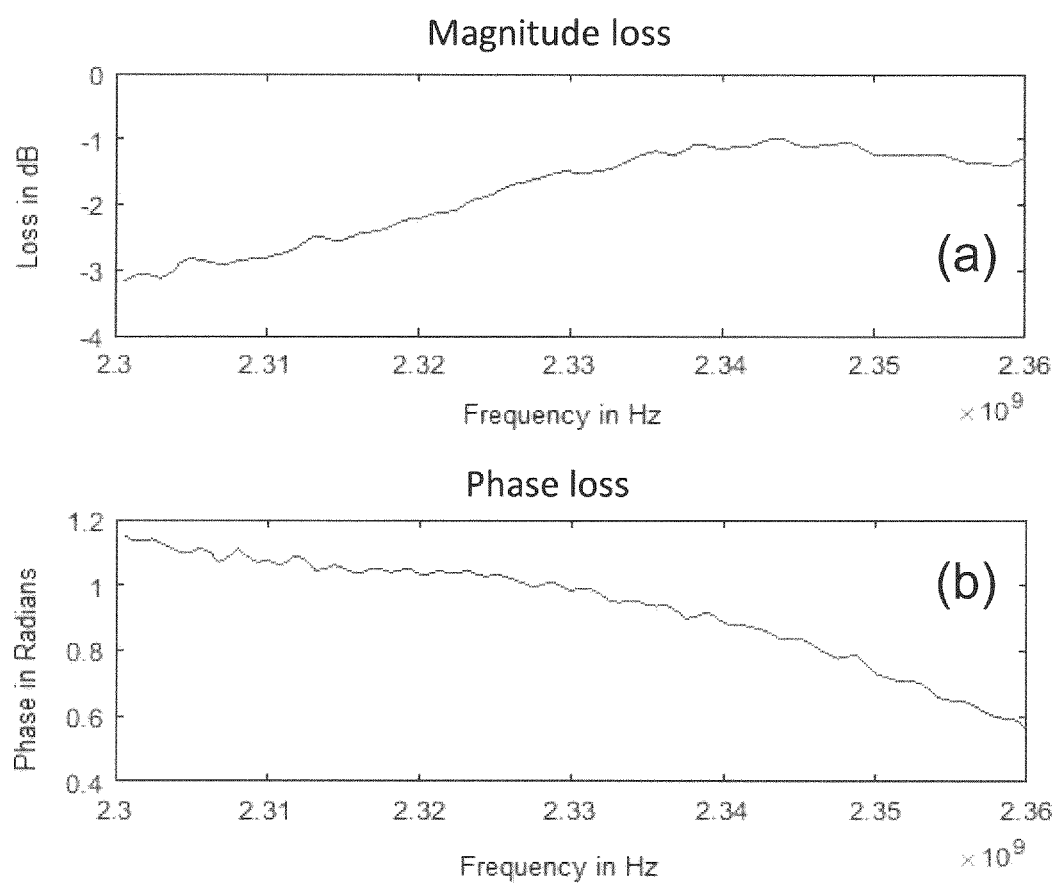
FIGS. 7 and 8 show the frequency dependent amplitude and phase variations through a band pass filter determined using the method of FIG. 5 and a vector network analyser, respectively.
Figure 8:
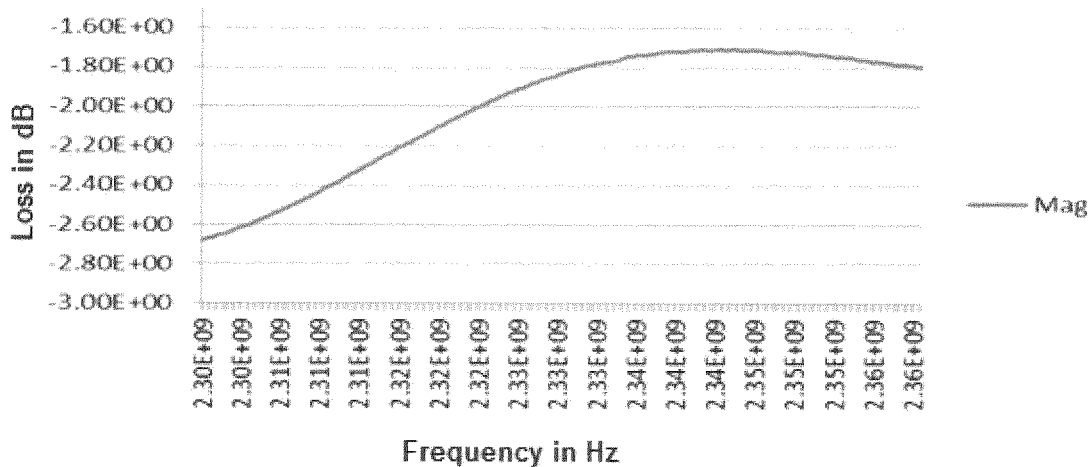
Figure 8:
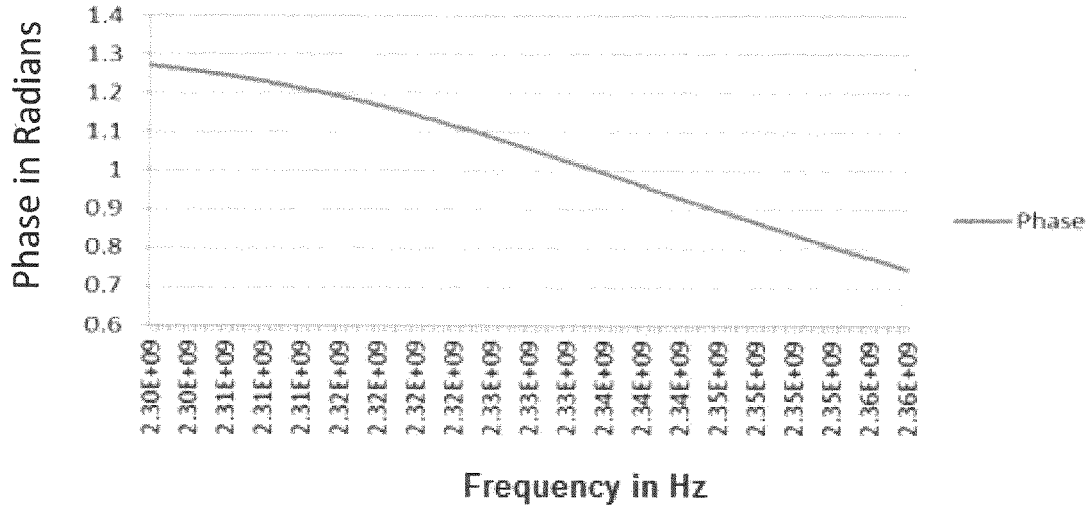

The above method was validated by comparing the amplitude and phase variations of a signal passing through a standard industrial band pass filter module VBFZ-2000-S+ measured using a sophisticated vector network analyser to those determined using the method 300. The input test signal was generated and digitally up-converted to an intermediate frequency of 90 MHz and then up-converted (via mixing with $f_{LO}$) to 2.33 GHz. The bandwidth of the input test signal was 60 MHz (i.e. 10 MHz more than a required analysis bandwidth of 50 MHz, in order to cover the band edges). FIGS. 7 and 8 show the amplitude and phase variations obtained from the method 300 and the vector network analyser, respectively. It can be seen that results match well over the bandwidth of 50 MHz in the range 2.31 to 2.36 GHz. The results of FIG. 7 were obtained using the apparatus 20 with a sinc-like input test signal according to equation 1 and a vector network analyser as a reference receiver 280.

The method 300 of characterising a single signal processing path can be applied to characterise multiple signal processing paths.

Figure 9:
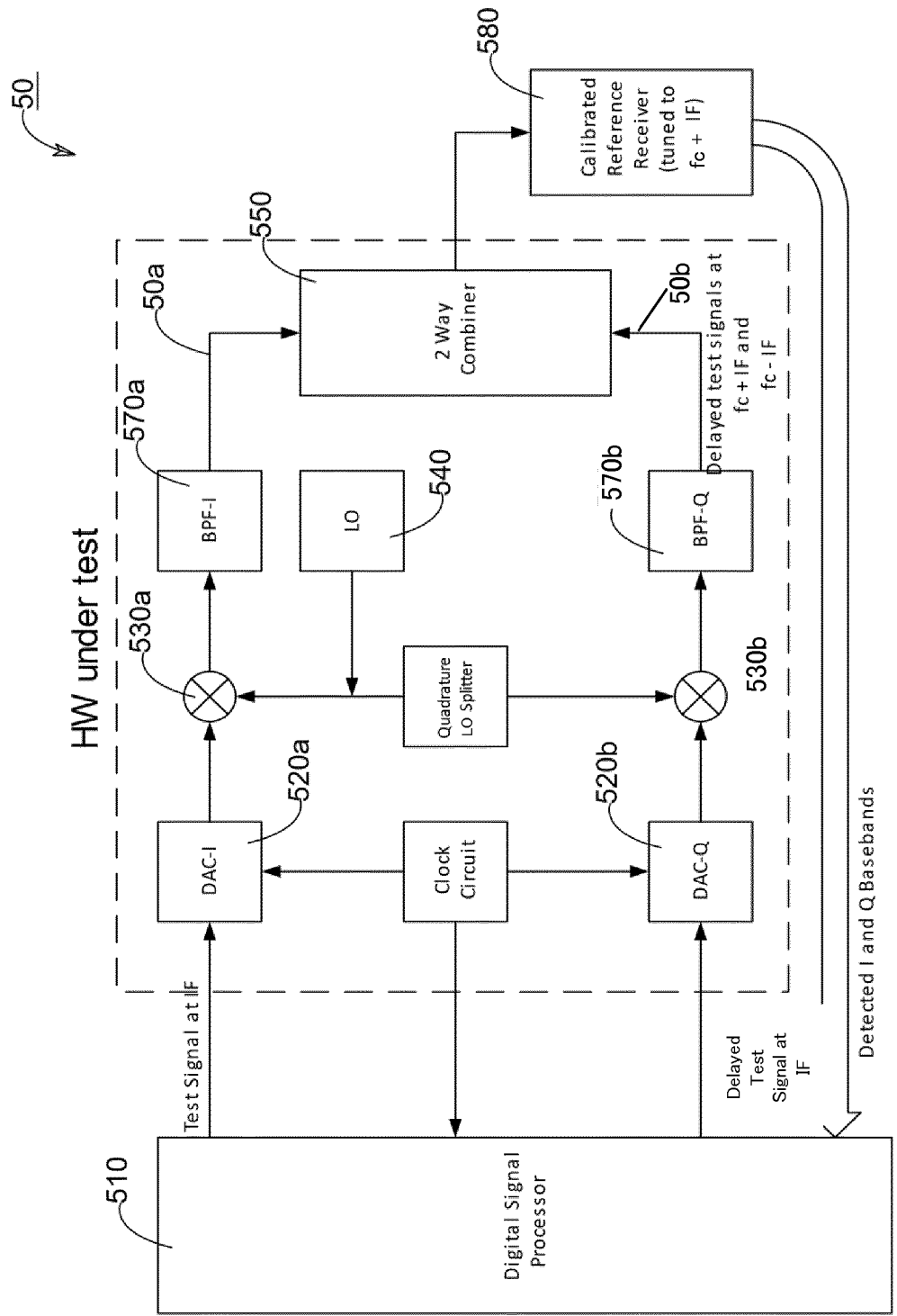
FIG. 9 shows a generalised block diagram of an example test apparatus for determining amplitude and phase correction coefficients for a first and second parallel signal processing path.

FIG. 9 shows a block diagram of an example test apparatus 50 for characterising the wide bandwidth characteristics of two parallel RF signal processing paths 50a and 50b. In this example, the signal paths 50a, 50b correspond to the I and Q paths 10a, 10b of the RF transmitter 10 shown in FIG. 1. The apparatus 50 comprises a DSP 510, a pair of DACs 520a, 520b, a pair of mixers 530a, 530b, a LO 540, a combiner 550, and a reference receiver 580. The components have the same function as described with reference to FIGS. 1 and 4. In particular, the DSP 510 is configured to generate and send a wide bandwidth input test signal to the input of each signal path 50a, 50b. Band pass filters 570a and 570b are optional, but in this example are considered part of the transmit chains which require characterising. The signal paths 50a and 50b may comprise additional components that require characterising (not shown).

When testing multiple parallel paths, the reference receiver 580 must be able to distinguish between the respective output responses for each signal path 50a, 50b under test. According to an embodiment of the invention, this is achieved by sending the wide bandwidth test signal to each path 50a, 50b at a predetermined time interval such that they do not temporally overlap. In this way, the phase and amplitude variations of each output response received sequentially in time by the reference receiver 580 can be evaluated in a similar way to the single path method 300.

Figure 10:
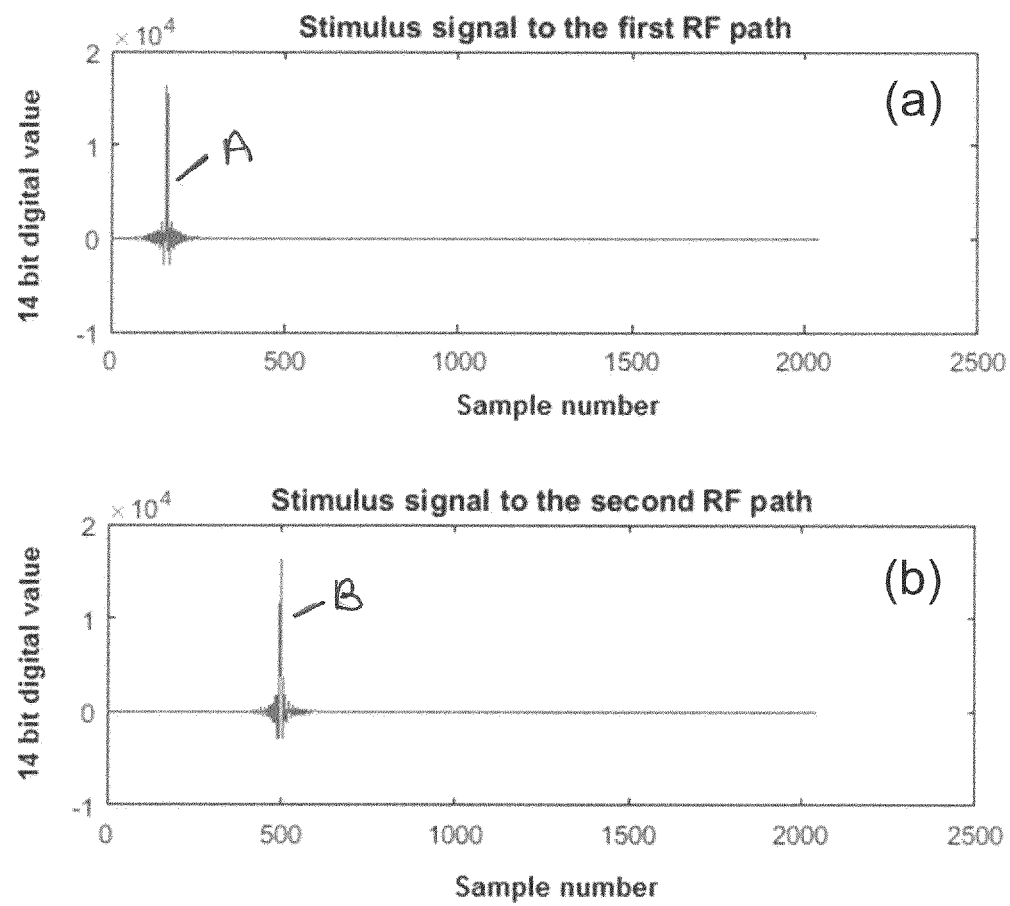
FIGS. 10a and 10b show an example input test signal provided to the first and second signal processing path of FIG. 9, respectively.

FIGS. 10a and 10b show example first A and second B input test signals provided to the first path 50a and to the second path 50a, respectively. The first input test signal A and the second input test signal B each comprise a non-zero oscillatory portion containing the wide bandwidth signal and zero portions at the beginning and end of the non-zero portion. As before, the zero padded portions are used to identify any timing offsets and/or propagation delays at the reference receiver 580. In addition, the zero padded portions also allow the temporal position (or delay) of the non-zero portion of the input test signal to be adjusted by varying the length of the zero padded portions. In this case, the first and second input test signals A, B are equal in total length, but the length of the zero padding portions of each input test signal are designed such that non-zero portions (containing the wide bandwidth signal) of the first and second input test signals A, B do not temporally overlap. In particular, the second input test signal B remains zero for the duration of the time the first input test signal A is non-zero, and vice versa. The non-zero portions of the first and second input test signals A, B may be separated by a zero portion, e.g. a guard interval.

With reference to FIG. 9, the up-converted first and second test signals are combined at combiner 550 such that the reference receiver 580 receives and performs a vector down-conversion operation on each output non-zero portion separated in time. The resulting combined output response for both signal paths 50a, 50b is fed back to the DSP 510 for signal analysis.

Figure 11:
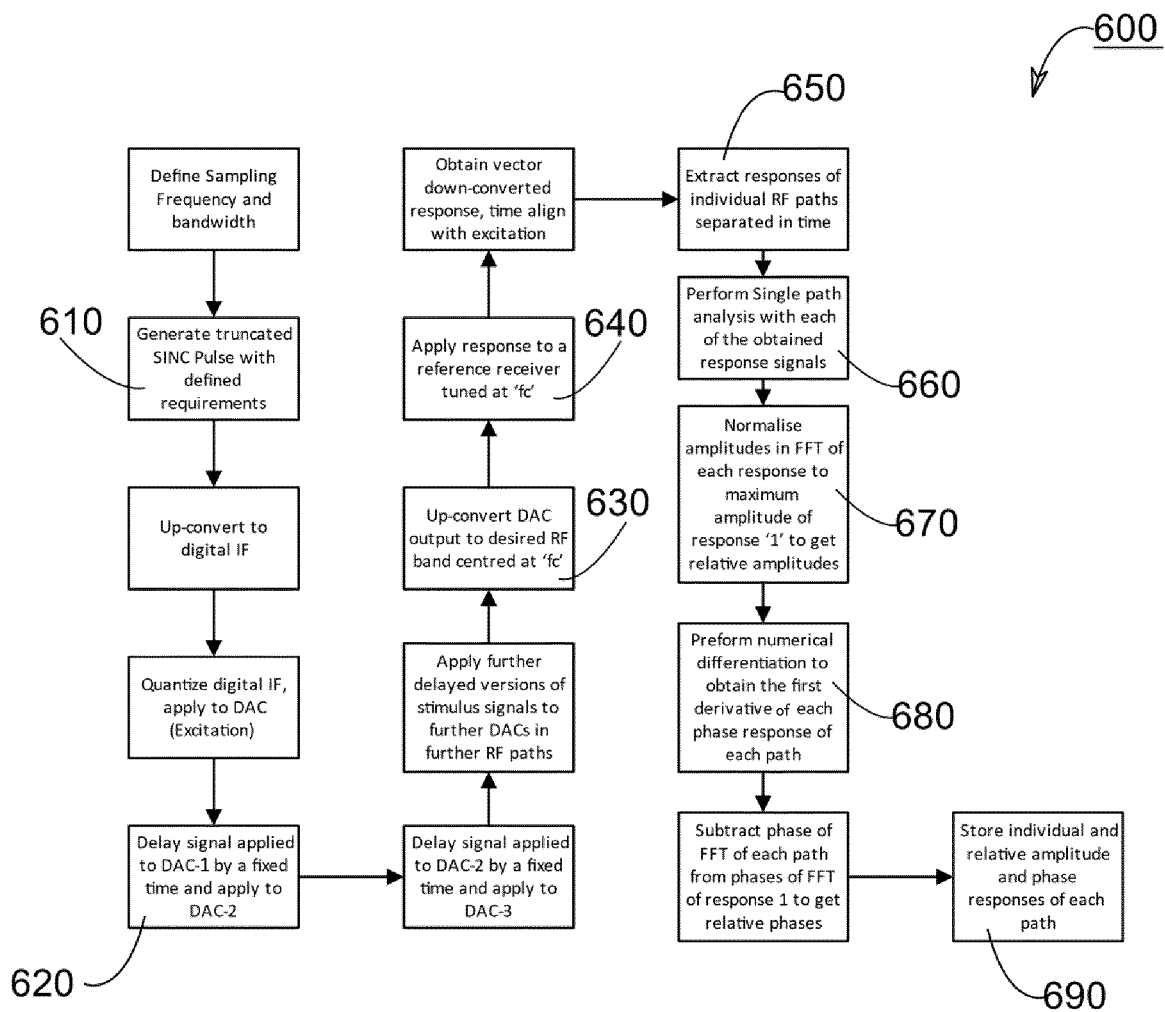
FIG. 11 shows a method of determining amplitude and phase correction coefficients for multiple signal processing paths.

FIG. 11 illustrates a method 600 of characterising the phase and amplitude correction coefficients for multiple parallel signal paths 50a, 50b, according to an embodiment of the invention.

In step 610, the first and second wide bandwidth input test signal are generated for the first and second signal paths 50a, 50b respectively, with the predetermined characteristics, e.g. bandwidth. The non-zero portion of the second input test signal is delayed with respect to the non-zero portion of the first input test signal.

Step 610 may comprise digitally generating the first and second input test signal with the DSP 510. Additionally or alternatively, generating the first and second input test signal for the first 50a and second signal paths 50b may further comprise digitally up-converting the digitally generated first and second input test signals for each path 50a, 50b with the DSP 510 to an intermediate frequency f, and then applying them to the respective DACs 520a, 520b of each path 50a, 50b. The wide bandwidth test signal for each signal path 50a, 50b may be or comprise a sinc-like test signal such as that shown in FIG. 2.

In step 620, the input test signals for the first and second paths 50a, 50b are provided to the input of the respective signal path under test 50a, 50b where they may undergo amplitude and phase distortions. The second input test signal is time delayed with respect to the first input test signal, as shown in FIGS. 10a and 10b. In the illustrated example of FIG. 9, the DACs 520a, 520b are the first elements of the signal processing paths under test 50a, 50b. Step 620 may further comprise providing the digitally generated first and second input test signals to the respective DACs 520a, 520b of each path 50a, 50 to generate an equivalent analogue first and second input test signal for each path 50a, 50b.

In step 630, the first and second input test signals are up-converted to the desired RF band centred on the carrier frequency $f_c$.

In step 640, the output of the signal paths under test 50a, 50b are detected by the reference receiver 580 and vector down-converted to obtain the I and Q components of a first and second output response for the respective first and second paths 50a, 50b. The first and second output response may then be fed back to the DSP 210. Step 640 may comprise combining the up-converted test signals for each signal path 50a, 50b at the combiner 550 before being detected by the reference receiver 580.

Any timing offsets between the first and second output responses and the first and second input test signals may be detected by performing a cross-correlation operation between the magnitude of the combined output response (including zero padding) and the magnitude of the sum of the first and second input test signals (without zero padding).

Any offset(s) detected may be eliminated by introducing a relative time delay between the first and second input test signals. For example, a relative time delay may be introduced in the leading path proportional to the timing offset observed in the lagging path.

Figure 12:
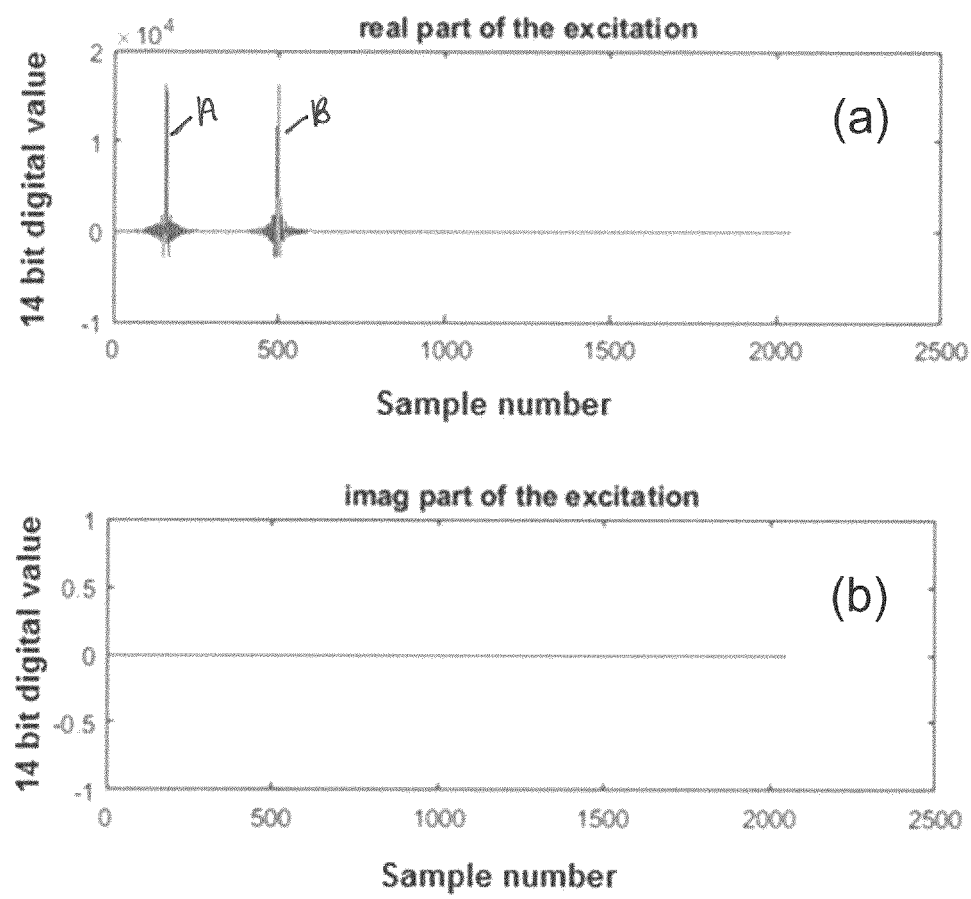
FIGS. 12a and 12b show the real and imaginary parts of an example of a summed input test signal provided to the first and second signal processing paths of the apparatus of FIG. 9, respectively.
Figure 13:
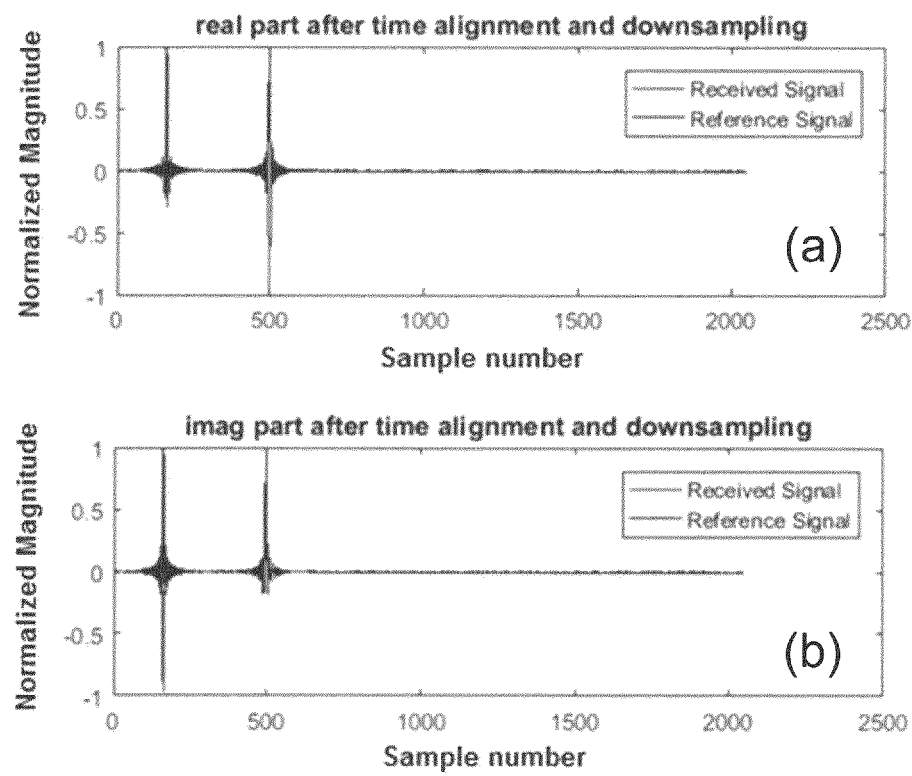
FIGS. 13a and 13b show the real and imaginary parts of an example of a output test signal aligned to the respective real part of the summed input test signal of FIG. 12.

FIGS. 12a and 12b show the real and imaginary parts of the sum of the first input test signal A and the second input test signal B (the net input test signal) shown in FIGS. 10a and 10b. FIGS. 13a and 13b show the real (I) and imaginary (Q) components of an example combined output response temporally aligned with the net input test signal shown in FIG. 12a.

In step 650, the non-zero portions of the first and second output response are extracted and stored. In step 660, the single path analysis of steps 350 to 390 of method 300 is performed on the extracted first and second output response to determine the amplitude and phase correction coefficients of first and second signal paths 50a, 50b.

Figure 14:
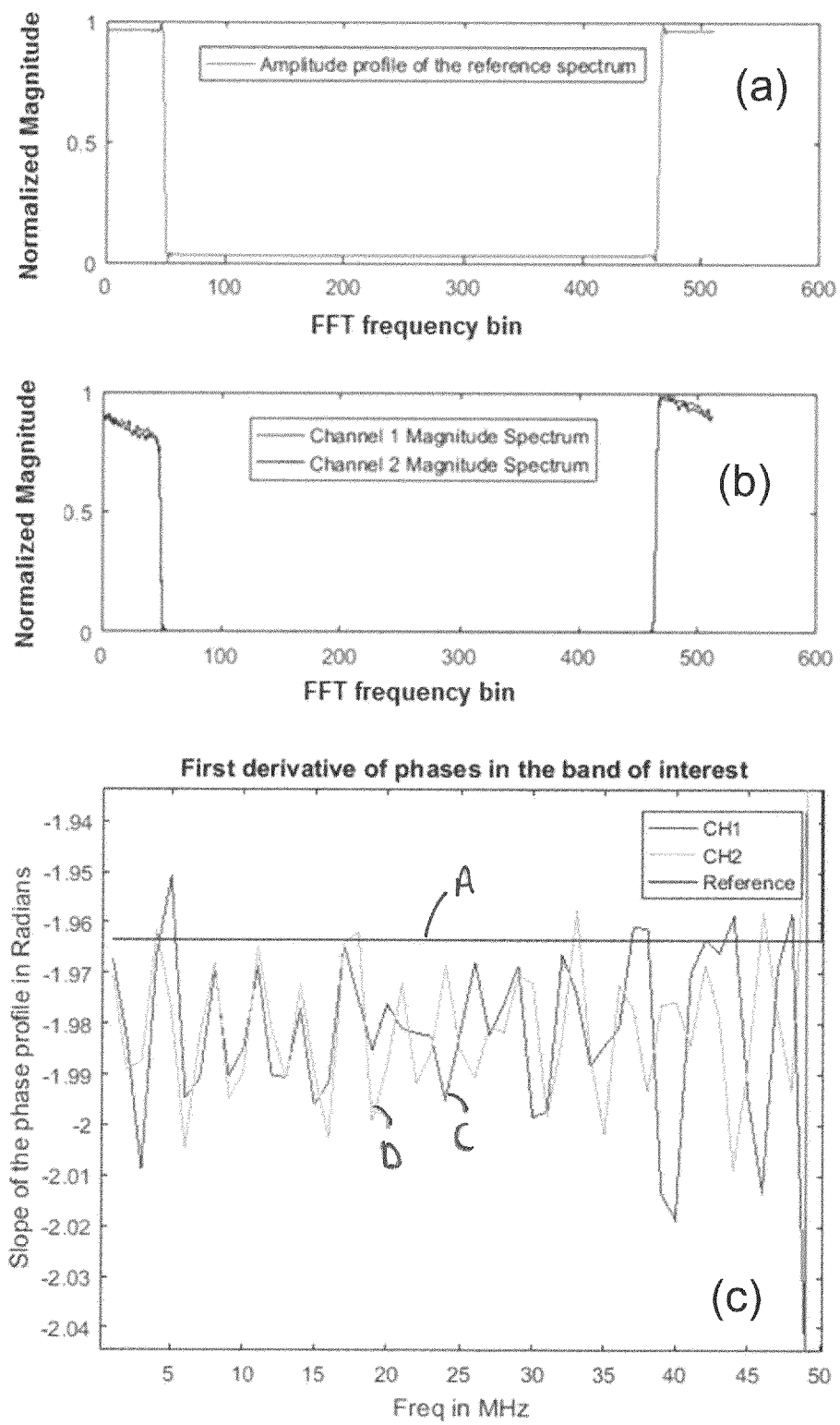

FIG. 14a shows the normalised magnitude spectrum of the first and second input test signals shown in FIGS. 10a and 10b (both the first and second input test signal yield identical magnitude and phase spectra). FIG. 14b shows the normalised magnitude spectra of the extracted first and second output responses shown in FIGS. 13a and 13b. FIG. 14c shows the first derivative of the corresponding phase spectra of the extracted first output response C and the extracted second output response D compared to the first derivative of the phase spectrum of the first input test signal A (which is the same as the second input test signal) in the frequency band of interest. The latter exhibits a constant value due to the linear phase spectrum of the sinc-like input test signal (see FIG. 3). Phase variations in the extracted first and second output response can clearly be seen from FIG. 14c.

Signal paths 50a and 50b (e.g. the I and Q channels of the transmitter 10) are expected to be in phase quadrature and have equal amplitude responses across the intended frequency band of operation. In addition, it is desired that the variation of phase of the individual frequency components in the band of interest is identical in both the paths 50a, 50b so that perfect quadrature relation is maintained between the two paths 50a, 50b over the intended frequency band. In other words, the phase and amplitude variations through each path 50a, 50b should be balanced.

In step 670, the magnitude spectra of the extracted first and second output response (obtained in step 660) are normalised to a common value, e.g. the maximum value of the magnitude spectrum of the extracted first output response. The relative amplitude correction coefficients for the second path 50b relative to the first path 50a are obtained by dividing the above normalised magnitude spectra of the extracted first output response by the normalised magnitude spectra of the extracted second output response. Step 670 may yield relative amplitude correction coefficients for any or each frequency sampled within the frequency band of interest.

In step 680, the first derivative of the phase spectrum of the extracted second output response (obtained in step 660) is subtracted from the first derivative of the phase spectrum of the extracted first output response (obtained in step 660) to obtain the relative phase correction coefficients of the second path 50b relative to the first path 50a. Step 680 may yield relative phase correction coefficients for any or each frequency sampled within the frequency band of interest.

In step 690, the relative magnitude and phase correction coefficients for the first and second paths 50a, 50b may be stored in a magnitude and phase correction coefficient matrix.

Although described as characterising two parallel signal paths, the above method 600 may be applied to characterise and balance any number of signal paths. For example, this would be applicable to Digital Out-phasing transmitters, digital beam forming transmitters, etc. In this case, a further delayed wide bandwidth input test signal may be provided to each additional signal path to ensure that the non-zero oscillatory portion of each input test signal does not temporally overlap with that of another. Phase and amplitude balance can be achieved by obtaining the relative phase and amplitude correction coefficients relative to the first path (or any specific signal path) in the same way as described in steps 670 and 680 above.

Figure 15:
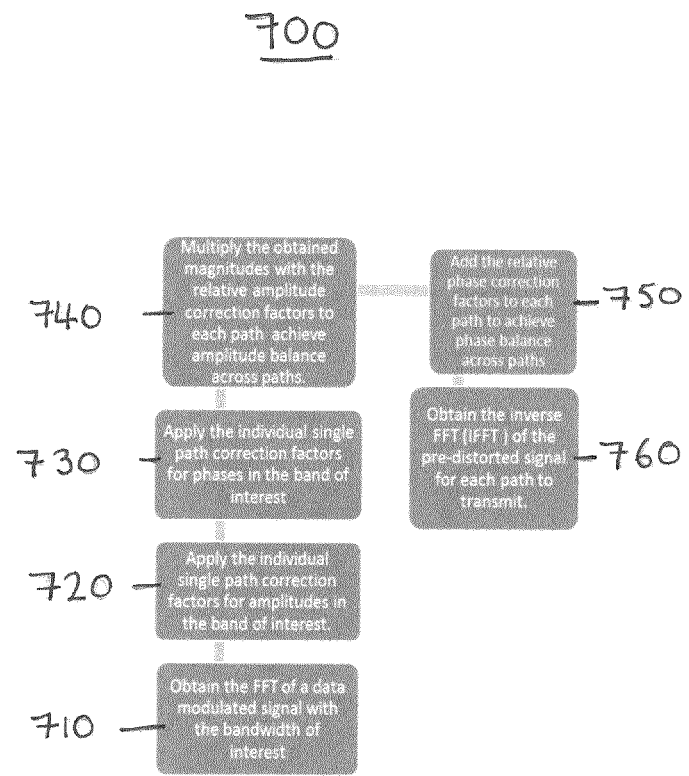
FIG. 15 shows a method of pre-compensating a signal for amplitude and phase distortions.

FIG. 15 illustrates a method 700 of pre-compensating data modulated baseband signals provided to multiple signal paths having the bandwidth of interest to account for any frequency dependent amplitude and phase distortions and achieve phase and amplitude balance between each signal path. Method 700 may be carried out after the steps of method 600. In step 710, an FFT operation is performed on the data modulated baseband signal intended to be provided to each signal path to obtain the respective magnitude and phase spectra for each data modulated baseband signal. In step 720, the amplitude correction coefficients for each individual signal path in the frequency band of interest, e.g. obtained at step 660, are multiplied with the magnitude components (obtained in step 710) of the respective data modulated baseband signal. In step 730, the phase correction coefficients for each individual signal path in the frequency band of interest, e.g. obtained at step 660, are added to the phase components (obtained in step 710) of the respective data modulated baseband signal.

In step 740, the relative amplitude correction coefficients for each signal path, e.g. obtained at step 670, are multiplied with the magnitude components (obtained in step 710) of the respective data modulated baseband signal to achieve amplitude balance across the multiple signal paths. In step 750, the relative phase correction coefficients, e.g. obtained at step 680, for each signal path are added to the phase components (obtained in step 710) of the respective data modulated baseband signal to achieve phase balance across the multiple signal paths.

In step 760, an inverse FFT operation is performed on the modified amplitude and phase spectra of each data modulated baseband signal to obtain pre-compensated data modulated baseband signals for transmission.

The two path analysis technique described in method 600 is particularly applicable to the area of quadrature modulator based wireless transmitters, whose generalized block diagram is depicted in FIG. 1. The phases between the first and second paths 10a, 10b are expected to maintain a difference of 90 degrees, failing which the integrity of the vector modulated data is compromised.

The two path analysis technique described in methods 600 and 700 was validated by determining and balancing the phase and amplitude variations across two parallel signal processing paths (paths 1 and 2) that make a quadrature modulator. The test apparatus (not shown) comprised a Texas Instruments evaluation board TSW30SH84 with a 4-channel DAC and quadrature up-converters used in combination with a digital back-end module TSW1400EVM also made by Texas Instruments. Channel 1 of the DAC was internally connected to the I channel of the quadrature up-converter and channel 2 of the DAC was internally connected to Q channel of the up-converter. A vector signal analyzer (VSA) made by Rohde and Schwarz was used as the reference receiver. The DAC was operated at a sample rate of 320 Msps which was also the maximum sample rate of the VSA. In this case the wide bandwidth test signal comprised a sinc-like input test signal according to equation 1, which was digitally up-converted to an intermediate frequency of $f_i$=90 MHz before applying it to the DAC channels. Each output of the DAC is further up-converted by the quadrature up-converter to frequencies $f_{LO}+f_i$ and $f_{LO}-f_i$ (where $f_{LO}$ is the frequency of the LO).

A test for amplitude and phase balance between two RF paths operated in quadrature is the suppression of an up-conversion image. If the input test signals that fed channels 1 and 2 of the DAC are is phase quadrature to one another (i.e. are orthogonal) and are further subject to quadrature up-conversion, the up-conversion product at the frequency $f_{LO}-f_i$ (the up-conversion image of the conversion product at frequency $f_{LO}+f_i$) would vanish, provided the magnitudes and phases of the frequency components at the outputs of the paths 1 and 2 are balanced and in perfect quadrature. The suppression of the up-conversion image can be measured at the VSA. Note that the extent of suppression that can be measured at the VSA is limited by the available dynamic range in the VSA. In this example, $f_{LO}$ was set at 2.24 GHz, yielding up-conversion products at frequencies 2.15 GHz (lower up-conversion product) and 2.33 GHz (higher up-conversion product).

Figure 16:
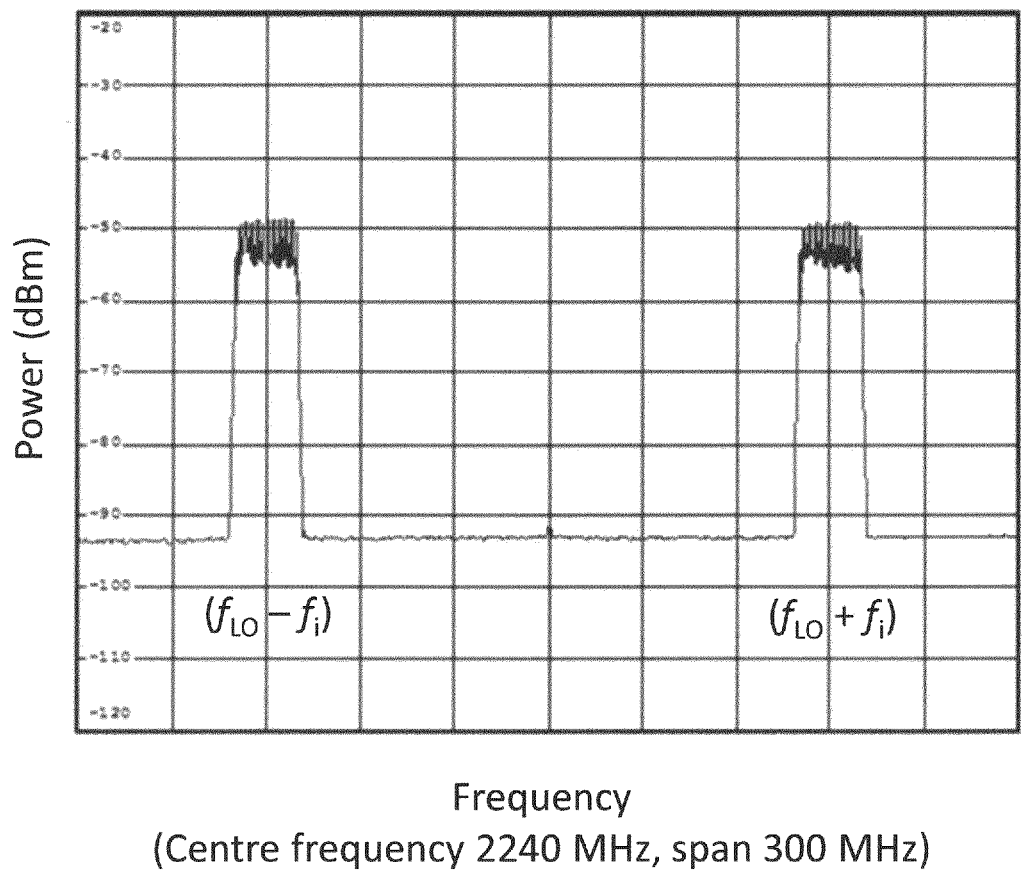
FIG. 16 shows an example output magnitude spectrum of a combined output test signal with a bandwidth of 20 MHz from two parallel signal processing paths of a modulator.

The relative amplitude and phase correction coefficients between paths 1 and 2 across bandwidths of 20 MHz and 60 MHz centred at $f_i$ were obtained using the proposed method 600, and applied to the input test signals using the method 700. Suppression of the up-conversion image (lower band signal) was tested by applying an input test signal to channels 1 and 2 of the DAC channel in phase quadrature to channels. FIG. 16 shows the magnitude spectrum of the combined time delayed output responses for paths 1 and 2 received by the VSA before down-conversion and before amplitude correction, resulting from input test signals of 20 MHz bandwidth (expressed as power, in units of dBm). The lower band (at $f_{LO}-f_i$) and the higher band (at $f_{LO}+f_i$) are both visible, indicating amplitude and phase imbalance. The horizontal frequency axis is defined by a centre frequency and a span, as indicated.

Figure 17:
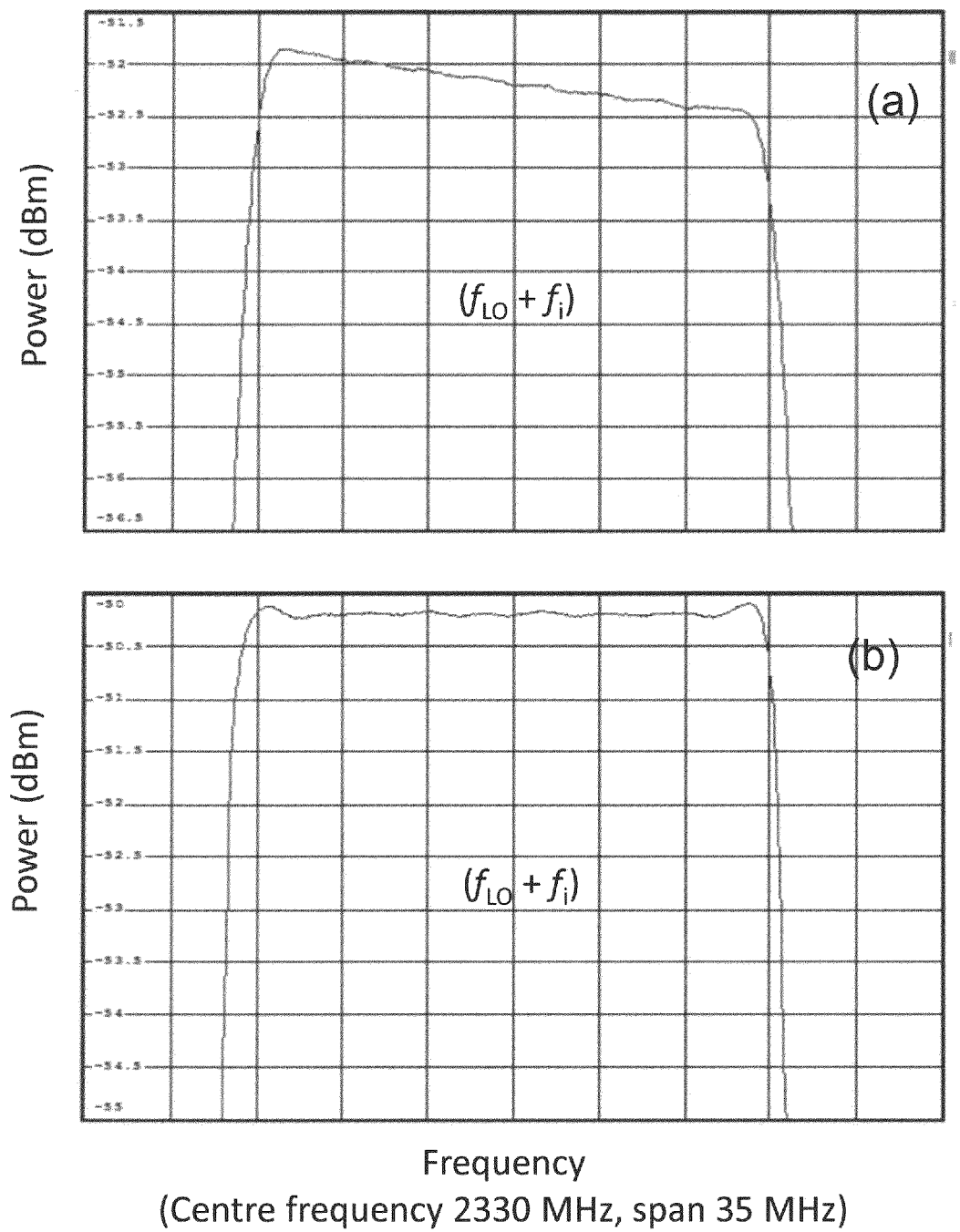
FIGS. 17a and 17b show an enlarged view of higher band of the output magnitude spectrum of FIG. 16 before and after pre-compensation using the method of FIG. 6, respectively.
Figure 18:
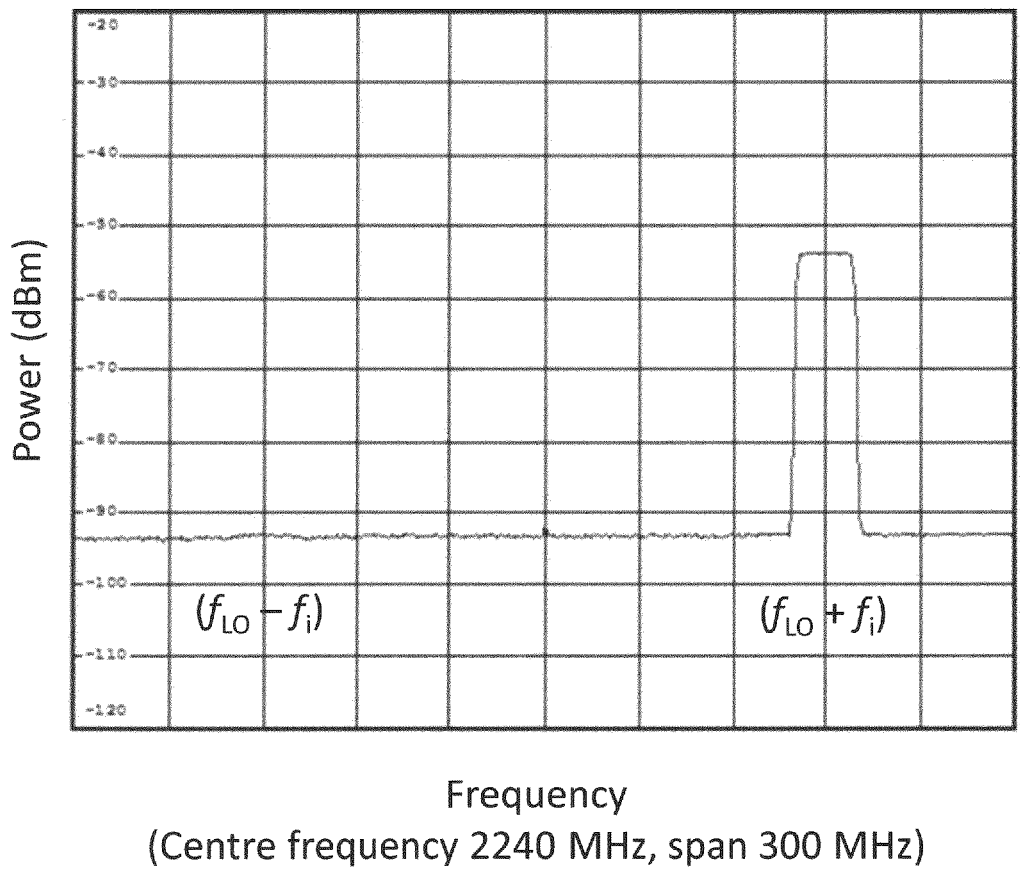
FIG. 18 shows the output magnitude spectrum of FIG. 16 after pre-compensation using the method of FIG. 15.
Figure 19:
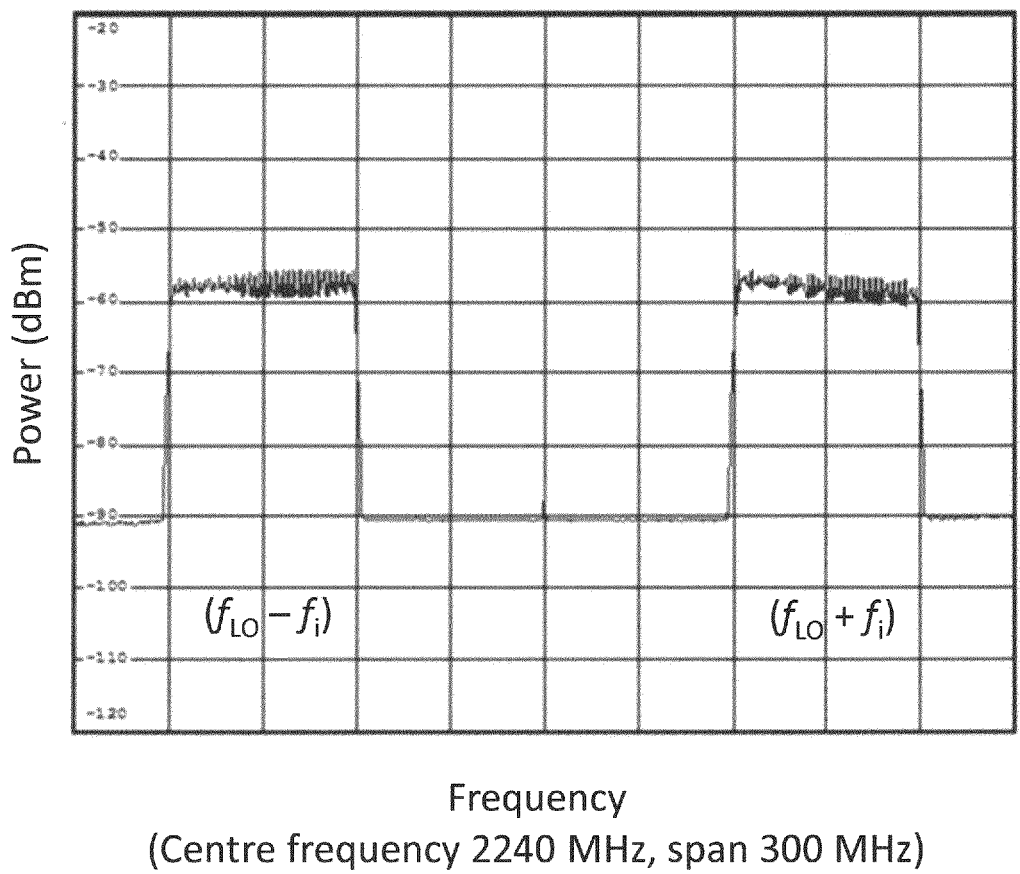
FIGS. 19, 20a, 20b and 21 show the same as FIGS. 16, 17a, 17b and 18 for example output test signals with a bandwidth of 60 MHz.
Figure 20:
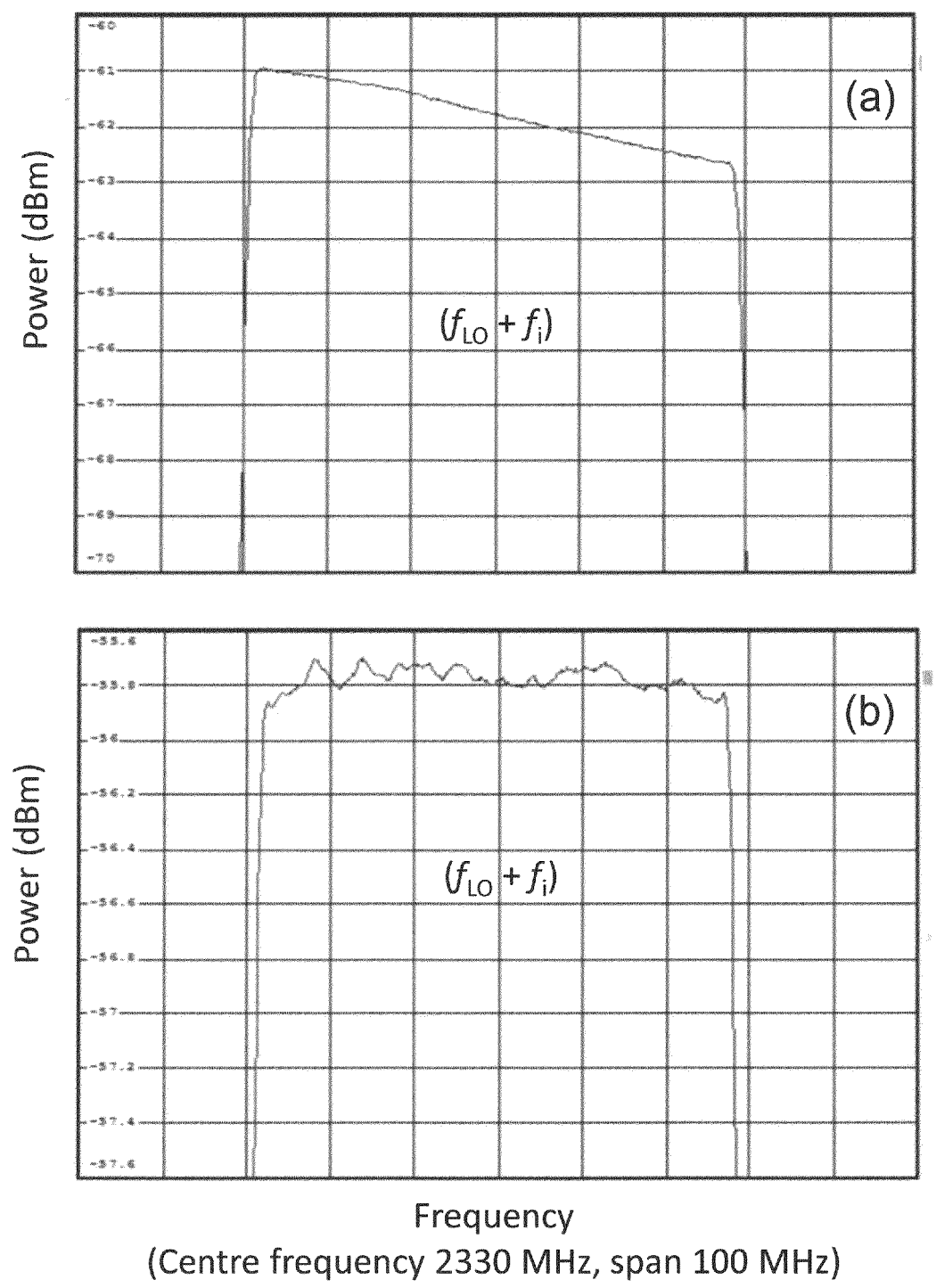
Figure 21:
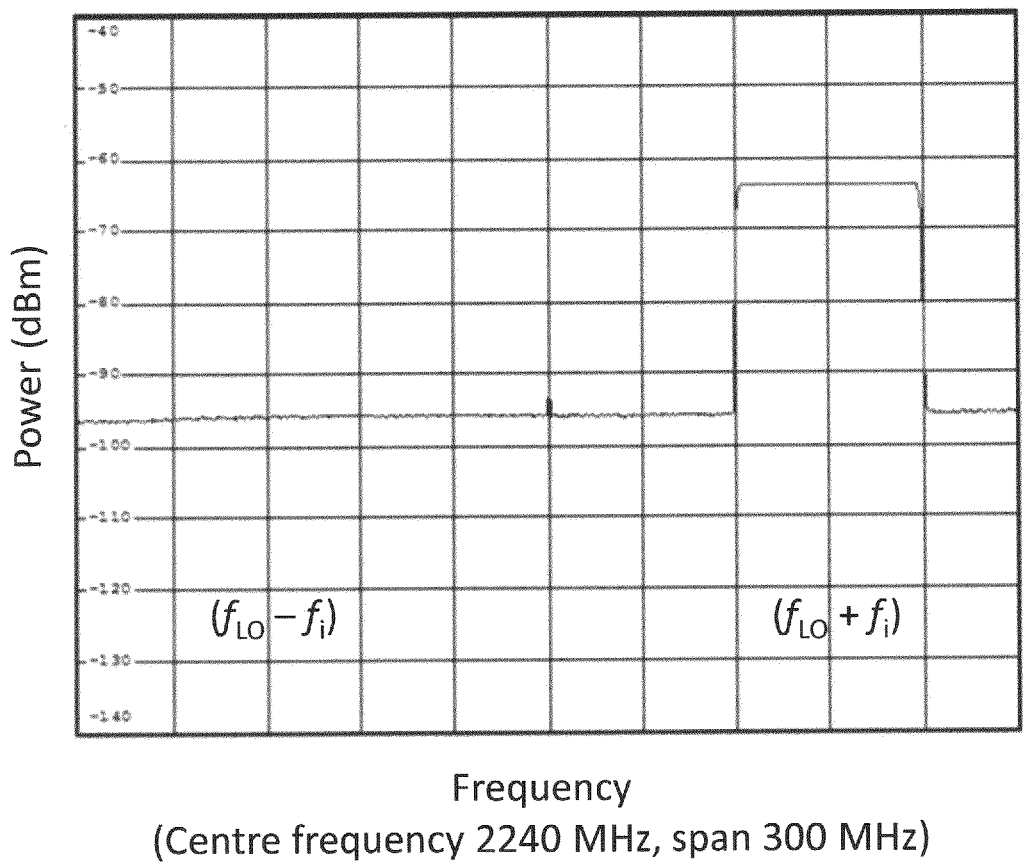

FIG. 17*a* shows the magnitude spectrum in the region of the higher band (at $f_{LO}+f_i$), which exhibits an amplitude tilt over the bandwidth of 20 MHz. FIG. 17*b* shows the magnitude spectrum of the same band after applying the amplitude correction coefficients obtained using the method 600, which has removed the amplitude tilt and reduced the amplitude distortion to less than 0.2 dBm. FIG. 18 shows the magnitude spectrum of the combined time delayed output responses for paths 1 and 2 of the modulator after amplitude and phase calibration. By comparison to FIG. 16, suppression of the lower band (at $f_{LO}-f_i$) is clearly observed, validating the method 600, 700.

FIGS. 19, 20*a* and 20*b* and 21 show similar results for an input test signal with a bandwidth of 60 MHz.

Figure 22:
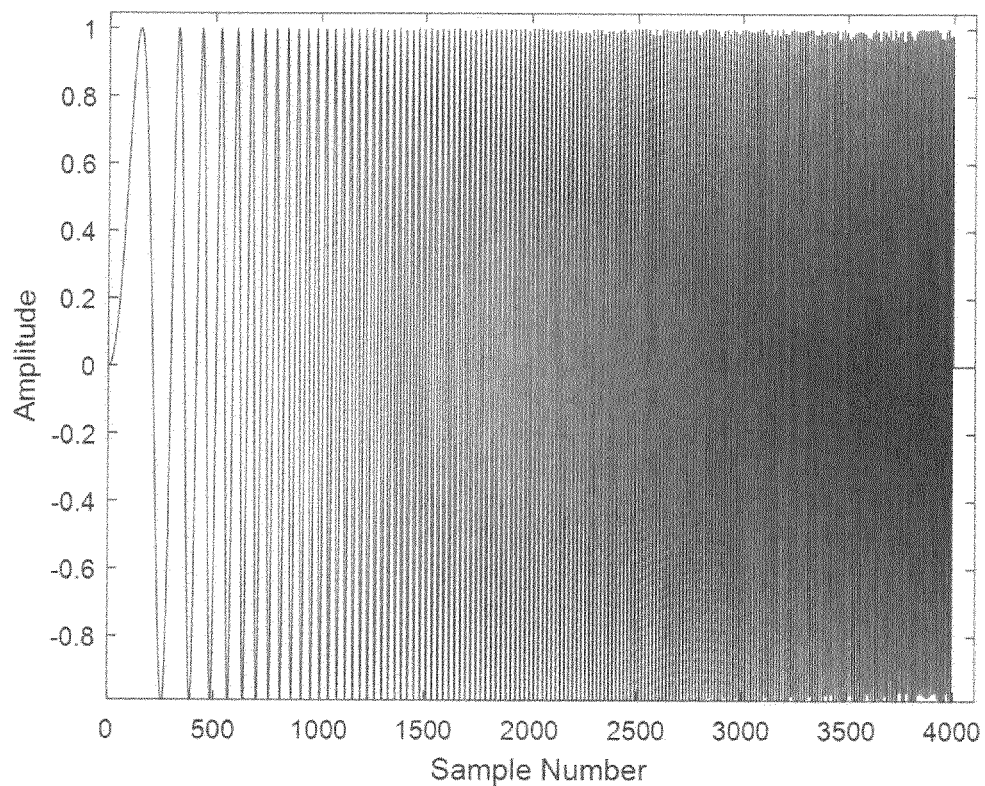
FIG. 22 shows another example test input test signal.
Figure 23:
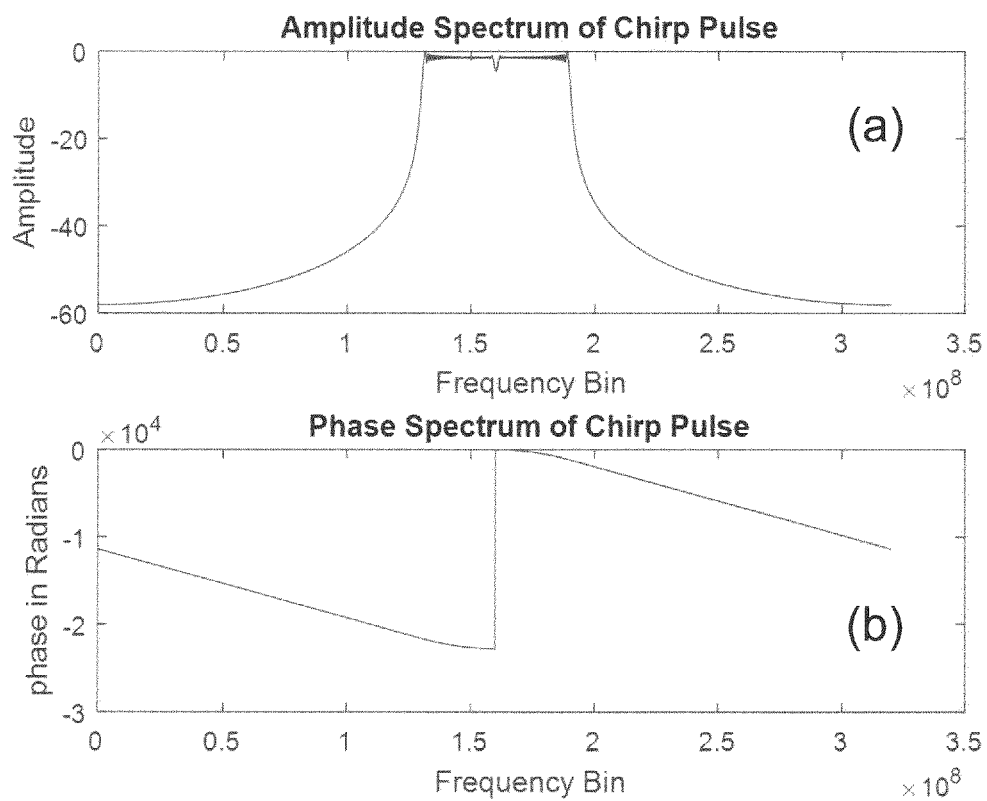
FIGS. 23a and 23b show the magnitude and phase spectra of the input test signal of FIG. 22, respectively.

In an alternative embodiment, the wide bandwidth input test signal may be or comprise a chirp signal. A chirp signal is one whose frequency varies with time e.g. increasing or decreasing. In contrast to a sinc-like signal, such as that shown in FIG. 2, a feature of the chirp signal is that its envelope remains constant. Further, unlike the sinc pulse, a chirp signal is a signal of finite length. It is therefore not necessary to truncate it, e.g. by multiplying it a window function. An example chirp sine wave is shown in FIG. 22. FIGS. 23*a* and 23*b* show the corresponding magnitude and phase spectrum of the chirp signal shown in FIG. 22, respectively.

As shown in FIG. 23*a*, the chirp signal excites a wide band of frequencies. However, in contrast to the sinc-like signal, the chirp signal does not have a flat magnitude spectrum (the magnitude spectrum exhibits peaks at the band edges). The peaks can be significantly reduced if the frequency is swept at a slower rate. In addition, as shown in FIG. 23*b*, the phase spectrum is not completely linear across the band of interest.

An advantage of the chirp signal is that its peak to average power ratio (PAPR) is lower than that of a sinc-like signal, despite exciting a wide range of frequencies. For example, the sine wave chirp shown in FIG. 21 has a PAPR of just 3 dB, compared to a PAPR of over 17 dB for an ideal sinc signal. The lower PAPR of the chirp signal is due to the fact that each frequency appears only once in the time domain, i.e. the frequency at every sample is unique. The analysis methods 300 and 600 are the same for both sinc-like and chirp input test signal.

The proposed methods provide a quick and efficient means to accomplish RF amplitude and phase calibration and equalization between multiple RF signal processing paths across a wide bandwidth of frequencies by exploiting the merits of digital signal processing for the generation of a test signal whose bandwidth is wide enough to cover a wider bandwidth of operation in comparison to conventional techniques. As the methods are non-iterative, the proposed technique significantly reduces the number of measurements performed on a reference receiver.

The ability to extend the application to any arbitrary number of signal processing paths is a distinct advantage for application in RF apparatus involved in multi-input multi-output (MIMO) transceivers along with Digital Doherty and Digital Outphasing transmitters From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A method of determining relative amplitude and phase correction coefficients for a plurality of parallel signal processing paths across a frequency band of interest, each of the plurality of parallel signal processing paths having an input and an output, the method comprising:

transforming an output test signal, resulting from an input test signal provided to the respective inputs of the each of the plurality of parallel signal processing paths being processed along the respective signal processing path, from the time domain to the frequency domain to obtain an output magnitude spectrum and an output phase spectrum for the each of the plurality of parallel signal processing paths;

comparing the output magnitude spectrum of a first of the plurality of parallel signal processing paths with the output magnitude spectrum of another of the plurality of parallel signal processing paths to determine, at one or more frequencies of the frequency band of interest, a relative amplitude correction coefficient for the another of the plurality of parallel signal processing paths; and/or comparing the output phase spectrum of the first of the plurality of parallel signal processing paths with the output phase spectrum of the another of the plurality of parallel signal processing paths to determine, at one or more frequencies of the frequency band of interest, a relative phase correction coefficient for the another of the plurality of parallel signal processing paths.

2. The method of claim 1, wherein the input test signal provided to each signal processing path is time shifted with respect to the input test signal provided to each other signal processing path; and/or is provided to each signal processing path simultaneously.

3. The method of claim 1, wherein the input test signal provided to each signal processing path comprises a zero amplitude portion and an oscillatory non-zero amplitude portion.

4. The method of claim 3, wherein the non-zero portion of each input test signal is the same;

and/or the non-zero portion of the input test signal provided to each signal processing path is temporally separated from the non-zero portion of the input test signal provided to each other signal processing path by a guard time interval.

5. The method of claim 1, the method further comprising:
applying, at the one or more frequencies of the frequency band of interest, the relative amplitude correction coefficients for the another of the plurality of parallel signal processing paths to the magnitude components of the data signal magnitude spectrum of the data signal intended to be provided to the input of the another of the plurality of parallel signal processing paths; and/or applying, at the one or more frequencies of the frequency band of interest, the relative phase correction coefficients for the another of the plurality of parallel signal processing paths to the phase components of the data signal phase spectrum of the data signal intended to be provided to the input of the another of the plurality of parallel signal processing paths.

6. The method of claim 1, further comprising temporally aligning each input test signal with its respective output signal; and, optionally or preferably, wherein temporally aligning each input test signal with its respective output signal comprises performing a cross-correlation operation between each input test signal and its respective output signal.

7. The method of claim 1, further comprising:
providing an input test signal to the input of the or each signal processing path; and
detecting each respective output test signal at the respective output of each signal processing path.

8. The method of claim 1, wherein the input test signal provided to the input of each signal processing path comprises a predetermined frequency bandwidth; and, optionally of preferably, wherein the predetermined frequency bandwidth of the input test signal is up to 20 MHz, 60 MHz, 100 MHz or 200 MHz.

9. The method of claim 1, wherein the input test signal provided to the input of each signal processing path comprises a signal whose magnitude spectrum exhibits a substantially uniform amplitude profile in the frequency band of interest, and/or whose phase spectrum exhibits a substantially linear phase profile in the frequency band of interest.

10. The method of claim 1, wherein the input test signal provided to the input of each signal processing path comprises a truncated sinc function; and, optionally or preferably, wherein the truncated sinc function is or comprises a sinc function multiplied by a window function; and, optionally or preferably, wherein the window function is or comprises any of: a Hamming window, a Blackman window, a Hanning window, a Hann window, or a Nuttall window.

11. The method of claim 1, wherein the input test signal provided to each signal processing path is or comprises a chirp signal.

12. The method of claim 1, wherein comparing the output magnitude spectrum of the first of the plurality of parallel signal processing paths with the output magnitude spectrum of the another of the plurality of parallel signal processing paths comprises:
dividing the output magnitude spectrum of the first of the plurality of parallel signal processing paths by the output magnitude spectrum of the another of the plurality of parallel signal processing paths, or dividing the output magnitude spectrum of the another of the plurality of parallel signal processing paths by the output magnitude spectrum of the first of the plurality of parallel signal processing paths.

13. The method of claim 1, wherein comparing the output phase spectrum of the first of the plurality of parallel signal processing paths with the output phase spectrum of the another of the plurality of parallel signal processing paths comprises:
subtracting the output phase spectrum of the first of the plurality of parallel signal processing paths from the output phase spectrum of the another of the plurality of parallel signal processing paths, or subtracting the output phase spectrum of the another of the plurality of parallel signal processing paths from the output phase spectrum of the first of the plurality of parallel signal processing paths.

* * * * *